(12) United States Patent
Obruchkov et al.

(10) Patent No.: US 12,495,983 B2
(45) Date of Patent: Dec. 16, 2025

(54) PERFUSION MEASUREMENT WITH LOW FIELD NMR

(71) Applicant: Wellumio Limited, Wellington (NZ)

(72) Inventors: Sergei Obruchkov, Wellington (NZ); Alice Little, Wellington (NZ)

(73) Assignee: Wellumio Limited, Wellington (NZ)

( * ) Notice: Subject to any disclaimer, the term of this patent is extended or adjusted under 35 U.S.C. 154(b) by 77 days.

(21) Appl. No.: 18/286,039

(22) PCT Filed: Dec. 16, 2021

(86) PCT No.: PCT/IB2021/061806
§ 371 (c)(1),
(2) Date: Oct. 6, 2023

(87) PCT Pub. No.: WO2022/214865
PCT Pub. Date: Oct. 13, 2022

(65) Prior Publication Data
US 2024/0180439 A1   Jun. 6, 2024

(30) Foreign Application Priority Data
Apr. 9, 2021 (AU) ............... 2021901035

(51) Int. Cl.
*A61B 5/026* (2006.01)
*A61B 5/055* (2006.01)
*G01R 33/563* (2006.01)

(52) U.S. Cl.
CPC ........... *A61B 5/0263* (2013.01); *A61B 5/055* (2013.01); *G01R 33/56366* (2013.01); *A61B 2560/0431* (2013.01)

(58) Field of Classification Search
CPC ............. A61B 5/0263; A61B 5/055; A61B 2560/0431; G01R 33/56366
See application file for complete search history.

(56) References Cited

U.S. PATENT DOCUMENTS

| | | | |
|---|---|---|---|
| 6,023,634 A | 2/2000 | Hanawa et al. | |
| 6,147,490 A | 11/2000 | Watanabe | |
| 9,035,651 B2* | 5/2015 | Nittka ............ | G01R 33/56563 324/309 |
| 2005/0215881 A1 | 9/2005 | Van Zijl et al. | |
| 2009/0005670 A1 | 1/2009 | Ichinose et al. | |

(Continued)

FOREIGN PATENT DOCUMENTS

| | | |
|---|---|---|
| EP | 1286171 A2 | 2/2003 |
| WO | 2004051288 A2 | 6/2004 |

OTHER PUBLICATIONS

Bhat et al., "Low-Field MRI of Stroke: Challenges and Opportunities", Journal of Magnetic Resonance Imaging, Aug. 22, 2020 (Aug. 22, 2020), vol. 54, No. 2, pp. 372-390.

(Continued)

*Primary Examiner* — Sean A Frith
(74) *Attorney, Agent, or Firm* — Greenberg Traurig, LLP; Melissa Hunter-Ensor; Nathan Hsu

(57) ABSTRACT

The present disclosure relates to the field of medical applications. In particular, to a measurement system and method for non-invasive detection and monitoring of physiological parameters, in particular perfusion, to provide clinically relevant information through Nuclear Magnetic Resonance (NMR) observation.

20 Claims, 23 Drawing Sheets

(56) References Cited

U.S. PATENT DOCUMENTS

| | | | | |
|---|---|---|---|---|
| 2009/0143666 | A1* | 6/2009 | Edelman | G01R 33/56325 600/410 |
| 2009/0253982 | A1* | 10/2009 | Wang | A61B 5/4884 600/419 |
| 2012/0223705 | A1* | 9/2012 | Lowery | A61B 5/055 324/307 |
| 2015/0272453 | A1* | 10/2015 | Heberlein | A61B 5/0263 600/419 |
| 2015/0285882 | A1 | 10/2015 | Mezrich et al. | |
| 2015/0374247 | A1 | 12/2015 | Park et al. | |
| 2016/0334491 | A1* | 11/2016 | Guo | G01R 33/56366 |
| 2017/0000377 | A1 | 1/2017 | Rosen et al. | |
| 2018/0031660 | A1* | 2/2018 | Basha | G01R 33/483 |
| 2018/0206800 | A1* | 7/2018 | Jasperse | G06T 7/0014 |
| 2018/0238978 | A1* | 8/2018 | McNulty | G01R 33/365 |
| 2022/0291319 | A1* | 9/2022 | Edelman | A61B 5/7207 |

OTHER PUBLICATIONS

Feinberg et al., "Arterial Spin Labeling with Simultaneous Multi-Slice Echo Planar Imaging", Magnetic Resonance in Medicine, Dec. 1, 2013 (Dec. 1, 2013), vol. 70, No. 6, pp. 1500-1506.

Kim et al., "Perfusion Imaging by a Flow-sensitive Alternating Inversion Recovery (Fair) Technique: Application to Functional Brain Images", Magnetic Resonance in Medicine, Mar. 1, 1997 (Mar. 1, 1997), vol. 37, No. 3, pp. 425-435.

Leviti et al., "NMR Population Inversion Using a Composite Pulse", Journal of Magnetic Resonance Imaging, Feb. 1, 1979 (Feb. 1, 1979), vol. 33, No. 2, pp. 473-476.

Little et al., "Continuous Perfusion Measurement With Singled Sided Low Field MRI", Proceedings of the Joint Annual Meeting ISMRM-ESMRMB 2022 & ISMRT Annual Meeting, London, UK, May 7-12, 2022, ISMRM, 2030 Addison Street, 7th Floor, Berkeley, Ca 94704 USA, Apr. 22, 2022 (Apr. 22, 2022), No. 1201, pp. 1-3.

Extended European Search Report mailed Jan. 29, 2025 in corresponding European Patent Application No. 21935908.0 (13 pages).

Klein, Hans-Martin, "Clinical Low Field Strength Magnetic Resonance Imaging: A Practical Guide to Accessible MRI," Springer International Publishing Switzerland, 2016, pp. 1-156.

Marques et al., "Low-Field MRI: An MR Physics Perspective," Journal of Magnetic Resonance Imaging, 2019, vol. 49, No. 6, pp. 1528-1542.

International Search Report and Written Opinion mailed Mar. 4, 2022 in corresponding PCT Patent Application No. PCT/IB2021/061806 (10 pages).

\* cited by examiner

PERFUSION MEASUREMENT WITH LOW FIELD NMR

CROSS-REFERENCE TO RELATED APPLICATIONS

This application is the U.S. National Stage application, pursuant to 35 U.S.C. § 371, of PCT International Patent Application No. PCT/IB2021/061806, filed Dec. 16, 2021, designating the United States and published in English, which claims the benefit of and priority to Australian Patent Application No. 2021901035, filed Apr. 9, 2021, the entire contents of each of which are incorporated by reference herein.

TECHNOLOGICAL FIELD

The present disclosure is generally, but not necessarily, in the field of medical applications and relates to an apparatus and method for non-invasive detection and monitoring of physiological parameters, in particular perfusion, to provide clinically relevant information through Nuclear Magnetic Resonance (NMR) observation.

BACKGROUND

All living tissue in the human body requires a consistent supply of fresh blood, delivering oxygen and other nutrients critical to the function of each cell. To satisfy this constant demand, blood is pumped throughout the circulatory system and delivered to capillary beds where efficient transfer can occur, a process known as perfusion. As a quantity, perfusion usually refers to the rate at which blood passes through a capillary bed and is linked to the metabolic demands of the local tissue.

There has been extensive interest in the application of perfusion measurement to the diagnosis, assessment and monitoring of brain strokes, where the primary mechanism of harm is a sustained restriction of local tissue perfusion—causing cell death and the formation of an infarct. This direct connection can allow for early identification of the affected region, showing up before many other markers of injury, as well as providing low-level clinical insight into the current status of any potential infarct and informing an appropriate response.

However, perfusion measurement is difficult to implement on a wide scale due to limitations in currently available perfusion-sensitive technologies, either due to a high system cost limiting availability (MRI, PET), the use of ionising radiation contraindicating additional imaging (CT, PET) or difficulty in penetrating the skull (ultrasound, laser-doppler). These issues severely limit diagnostic and assessment applications, and almost completely rule out any form of semi-continuous, perfusion-informed, acute-stage monitoring of recovery.

Many forms of magnetic resonance imaging (MRI) perfusion imaging have been developed, refined and implemented in routine clinical use. These suffer the disadvantage that an expensive non-portable machine is required to perform the test. Also, tracer-based approaches using contrast agents are usually required, for example gadolinium based contrast agents. (GBCAs). These are undesirable for several reasons, and there are recommendations to limit their use. MRI techniques are known for imaging perfusion without the use of contrast agents. Arterial Spin Labelling (ASL) is an alternative to the more widespread exogenous tracer-based MRI perfusion measurement techniques. These sequences utilise the blood within the body as a temporary tracer, removing the need for the contrast agent injection. The primary limitations of these techniques arise from the relatively low signal-to-noise ratio-high resolution images are usually not feasible due to impractically long acquisition times. Hence these techniques do not appear usable in low field strength systems.

SUMMARY

It is an object of the disclosure to provide an improved non-invasive perfusion measurement and/or monitoring device. It is additionally or alternatively an object of the disclosure to provide a useful alternative to known methods, apparatus or systems.

In one aspect the disclosure provides a perfusion measurement system including: a magnetic structure configured to receive a body part of an examined subject and to create an inhomogeneous static magnetic field within a test tissue of the examined subject;
  means to apply a first inversion recovery radiofrequency (RF) pulse sequence and a second inversion recovery RF pulse sequence to the test tissue, wherein an inversion pulse of the first or second pulse sequences has a different bandwidth than a corresponding inversion pulse of the other of the first or second pulse sequence; and acquisition means to acquire magnetic resonance signal data from the pulse sequences and process the magnetic resonance signal data to provide perfusion data.

In one embodiment, the signal data from the pulse sequences is compared to provide an estimation or measurement of at least one of: flow, velocity or perfusion.

In one embodiment, each of the inversion recovery RF pulse sequences includes the inversion pulse, an excitation pulse and a Carr-Purcell-Meiboom-Gill (CPMG) acquisition.

In one embodiment, the bandwidth of the inversion recovery RF pulse sequences other than the inversion pulses is substantially the same.

In one embodiment, the inversion pulse for the first inversion recovery RF pulse sequence has a narrower bandwidth than the inversion pulse for the second inversion recovery RF pulse sequence.

In one embodiment, the first inversion recovery RF pulse sequence affects an acquisition volume within the test tissue.

In one embodiment, the inversion pulse of the second inversion recovery RF pulse sequence is configured to invert NMR spins in a control volume.

In one embodiment, the control volume exceeds the acquisition volume.

In one embodiment, the control volume is configured to provide an inversion buffer.

In one embodiment, the inversion pulse includes or is configured as a composite pulse.

In one embodiment, the narrow bandwidth pulse sequence includes a flow-sensitive sequence, and the pulse sequence having a wider bandwidth inversion pulse includes a flow-resistant pulse sequence.

In one embodiment, the narrow bandwidth pulse sequence includes a tagging sequence, and the pulse sequence having a wider bandwidth inversion pulse includes a control sequence.

In one embodiment, the control sequence acquires data for a control volume of the test tissue and the tagging sequence acquires data for an acquisition volume, wherein the acquisition volume is within the control volume. Preferably the control volume is sufficiently greater than the acquisition volume to provide an inversion buffer.

In one embodiment, the CPMG acquisitions are summed to improve signal to noise ratio.

In one embodiment, a baseline pulse sequence is applied to the test tissue prior to the first and second pulse sequences to provide a sampling cell.

In one embodiment, the sampling cell is repeated. Preferably the results from the sampling cells are averaged.

In one embodiment, a composite pulse is used to provide the inversion pulse. Preferably the composite pulse includes two 90 degree pulses separated by a 180 degree pulse, and most preferably a 90 degree×pulse, a 180 degree y pulse and another 90 degree×pulse.

In one embodiment, the bandwidths of the pulse sequences are configured dependent on flow rates. Preferably the inversion recovery time is selected dependent on the perfusion fluid type.

In one embodiment, the test tissue includes a body part or organ. Preferably the body part or organ includes a brain.

In one embodiment, the perfusion measurement is provided in real time.

In one embodiment, the magnetic field strength is less than 1 Tesla. More preferably the magnetic field strength is less than 0.5 T, and more preferably in the order of 0.25 T.

In one embodiment, the system is single-sided.

In one embodiment, the perfusion measurement system is portable. Preferably, the portable system weighs less than about 30 kgs. More preferably, the portable system weighs less than about 25 kgs.

In another aspect the disclosure provides a method for measuring perfusion including: applying an inhomogeneous static magnetic field to a test tissue of an examined subject; applying a first inversion recovery RF pulse sequence and a second inversion recovery RF pulse sequence to the test tissue, wherein an inversion pulse of the first or second pulse sequences has a narrower bandwidth than a corresponding inversion pulse of the other of the first or second pulse sequence; and
  acquiring magnetic resonance signal data from the pulse sequences and processing the magnetic resonance signal data to provide perfusion data.

In one embodiment, the method further includes comparing the signal data from the pulse sequences to provide an estimation or measurement of at least one of: flow, velocity or perfusion.

In one embodiment, each of the inversion recovery RF pulse sequences includes the inversion pulse, an excitation pulse and a CPMG acquisition.

In one embodiment, the method further includes configuring the bandwidth of the inversion recovery RF pulse sequences other than the inversion pulses to be substantially the same.

In one embodiment, the method further includes configuring the inversion pulse for the first inversion recovery RF pulse sequence to have a narrower bandwidth than the inversion pulse for the second inversion recovery RF pulse sequence.

In one embodiment, the method further includes configuring the bandwidth of the first inversion recovery RF pulse sequence to affect an acquisition volume within the test tissue.

In one embodiment, the method further includes configuring the bandwidth of the inversion pulse of the second inversion recovery RF pulse sequence to invert NMR spins in a control volume.

In one embodiment, the control volume exceeds the acquisition volume.

In one embodiment, the method further includes configuring the control volume is to provide an inversion buffer.

In one embodiment, the method further includes configuring the inversion pulse as a composite pulse.

In one embodiment, the composite pulse includes two 90 degree pulses separated by a 180 degree pulse. Preferably the CPMG acquisitions are summed to improve signal to noise ratio.

In one embodiment, a baseline pulse sequence is applied to the test tissue prior to the first and second pulse sequences to provide a sampling cell.

In one embodiment, the sampling cell is repeated. Preferably the results from the sampling cells are averaged.

In one embodiment, the composite pulse includes a 90 degree×pulse, a 180 degree y pulse and another 90 degree× pulse.

In one embodiment, the bandwidths of the pulse sequences are configured dependent on flow rates. Preferably the inversion recovery time is selected dependent on the perfusion fluid type.

In one embodiment, the method further includes the step of determining whether reduced perfusion has occurred when compared to clinically acceptable levels.

In one embodiment, the subject is a human.

In another aspect the disclosure provides a method of diagnosing reduced blood flow or perfusion below clinically acceptable levels in a subject using a measurement system as defined in the embodiment above, including: applying an inhomogeneous static magnetic field to a test site of the subject;
  applying a first inversion recovery RF pulse sequence and a second inversion recovery RF pulse sequence to the test site, wherein an inversion pulse of the first or second pulse sequences has a different bandwidth than a corresponding inversion pulse of the other of the first or second pulse sequence;
  acquiring magnetic resonance signal data from the pulse sequences and processing the magnetic resonance signal data to provide perfusion data; and
  determining whether the perfusion data falls below clinically acceptable levels in the test site of the subject.

In one embodiment, the subject is a human.

In one embodiment, the test tissue to be examined is a brain, breast, a kidney, a liver, or skin of the subject. In another embodiment, the test site to be examined is a brain, breast, a kidney, a liver, or skin of the subject.

The present disclosure is described below with reference to specific embodiments. However, other embodiments than the above described are equally possible within the scope of the disclosure. Different method steps than those described, performing the method by hardware or software, may be provided within the scope of the disclosure. The different features and steps of the disclosure may be combined in other combinations than those described.

Further aspects of the disclosure will become apparent from the following disclosure.

In this specification, where reference has been made to external sources of information, including patent specifications and other documents, this is generally for the purpose of providing a context for the description of the features described. Unless stated otherwise, reference to such sources of information is not to be construed, in any jurisdiction, as an admission that such sources of information are prior art or form part of the common general knowledge in the art.

As used herein the term "clinically acceptable" refers to generally accepted or understood standards for medical practice, medical practitioners, or clinicians.

As used herein, the term "about" in connection with a referenced numeric indication means the referenced numeric indication plus or minus up to 10% of that referenced numeric indication. For example, the language "about 30" kgs covers the range of 33 kgs to 27 kgs.

As used herein the term "and/or" means "and" or "or", both. As used herein "(s)" following a noun means the plural and/or singular forms of the noun. The term "comprising" as used in this specification means, "including" or "consisting at least in part of". When interpreting statements in this specification which include that term, the features prefaced by that term in each statement all need to be present, but the other features can also be present. Related terms such as "comprise" and "comprised" are to be interpreted in the same matter. The entire disclosures of all applications, patents and publications, cited above and below, if any, are hereby incorporated by reference.

DRAWING DESCRIPTION

One or more examples or embodiments of the disclosure will be described below with reference to the accompanying drawings, in which.

Shared experiment parameters: 6000 ms TR, 1600 ms TI, 1200 us TE, 16 scans, 30 us control inversion.

Figure 13:
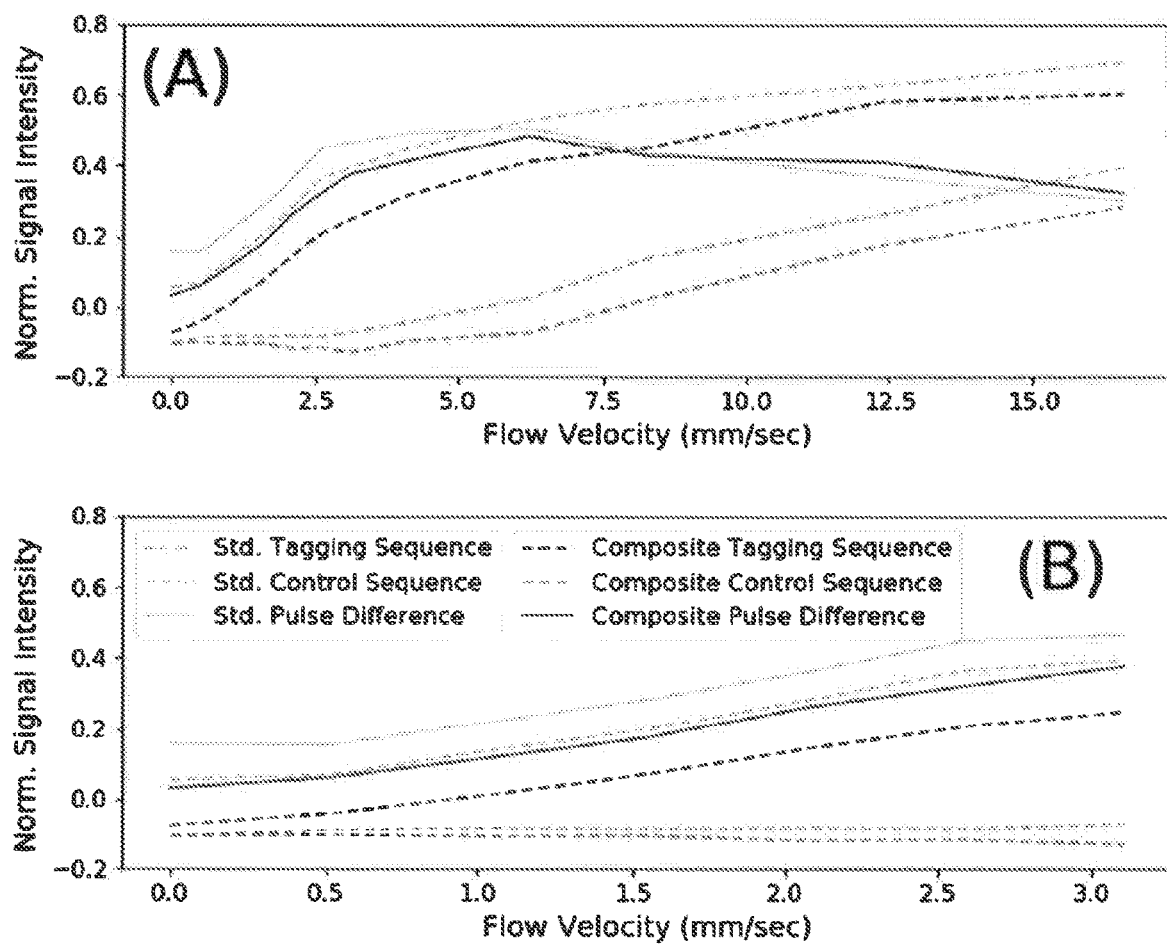

FIG. 13 shows a performance comparison between IFAIR sequence with standard single pulse inversions vs composite pulse inversions.

Measured on undoped distilled water with $T_1$=2135 plus or minus 5 ms. (A) Full flow range. (B) Highlight of lower flow trends. Experiment parameters: 6000 ms TR, 1600 ms TI, 1200 us TE, 16 scans, 100 us tagging inversion, 30 us control inversion.

Figure 14:
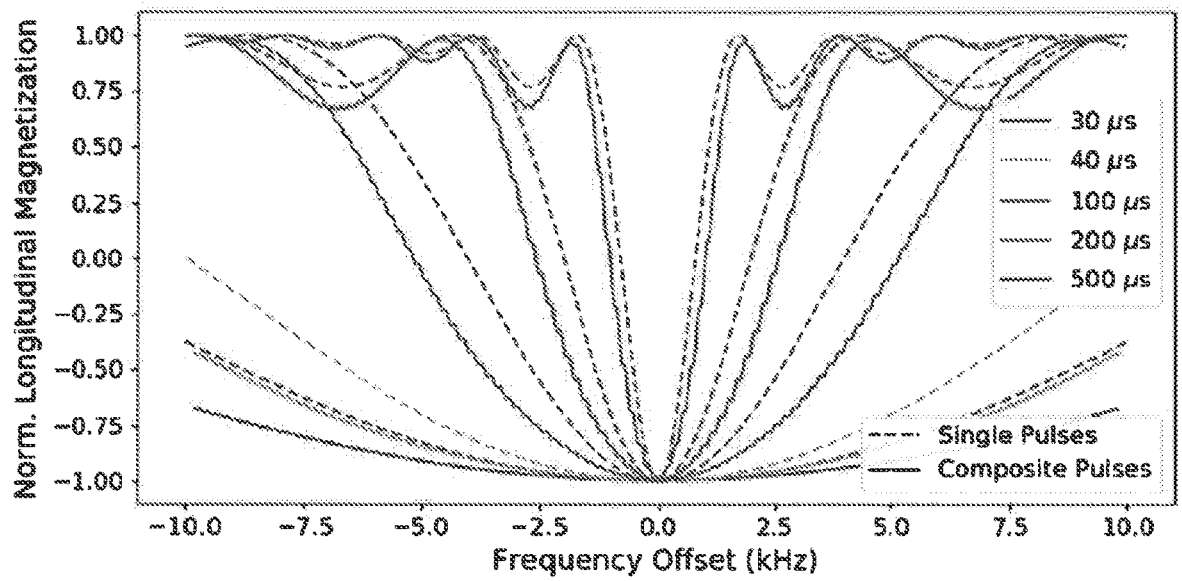

FIG. 14 shows simulated data comparing Mz, 0 resulting from standard single pulse inversions vs 90x–180y–90× composite pulse inversions.

Figure 15:
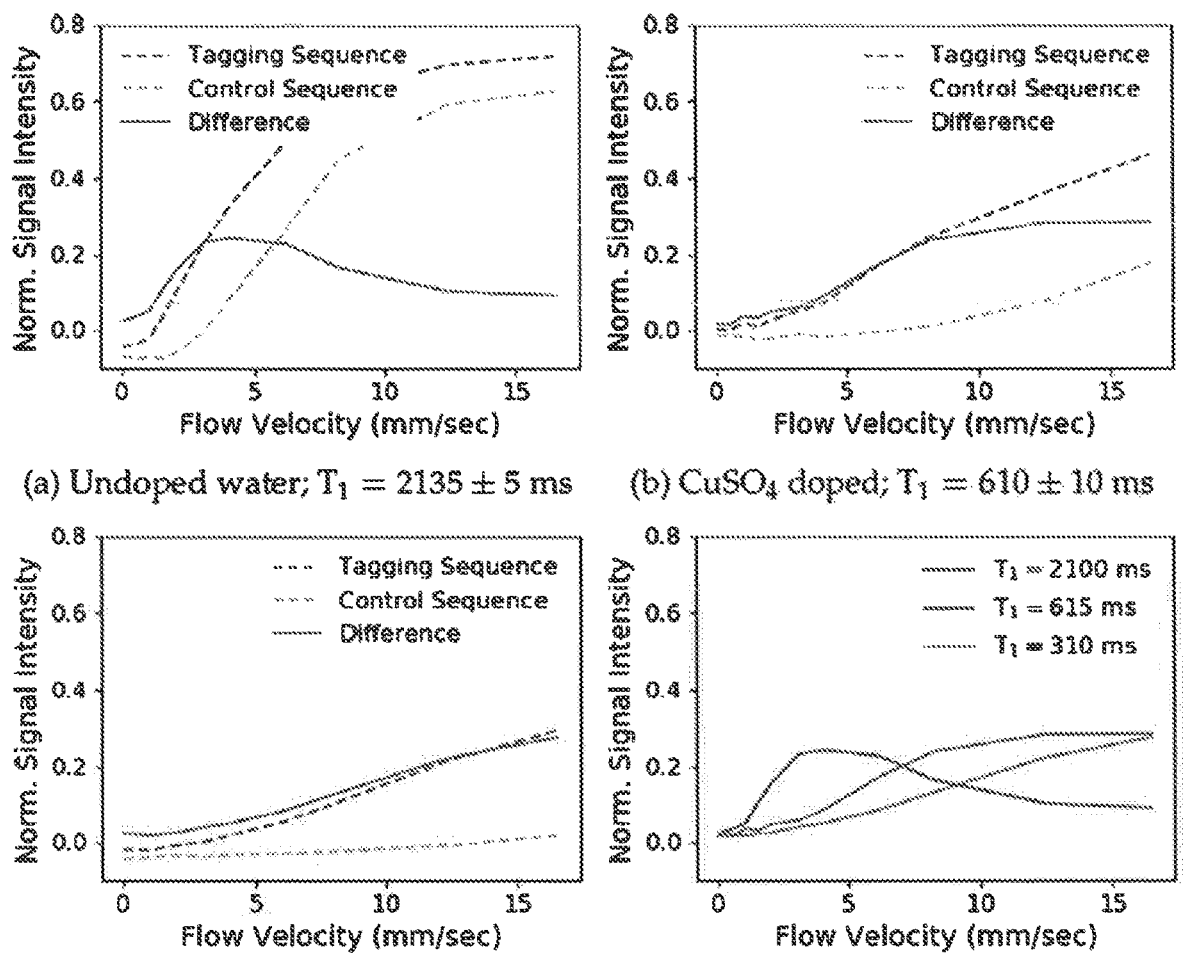

FIG. 15 shows a comparison between the trends observed with varying sample $T_1$. Specific parameters: (A) TR: 6000 ms, TI: 1300 ms (B) TR: 3000 ms, TI: 400 ms (C) TR: 1500 ms, TI: 200 ms. Generic parameters: 1200 us TE, 32 scans, 200 us tagging inversion, 30 us control inversion.

Figure 16:
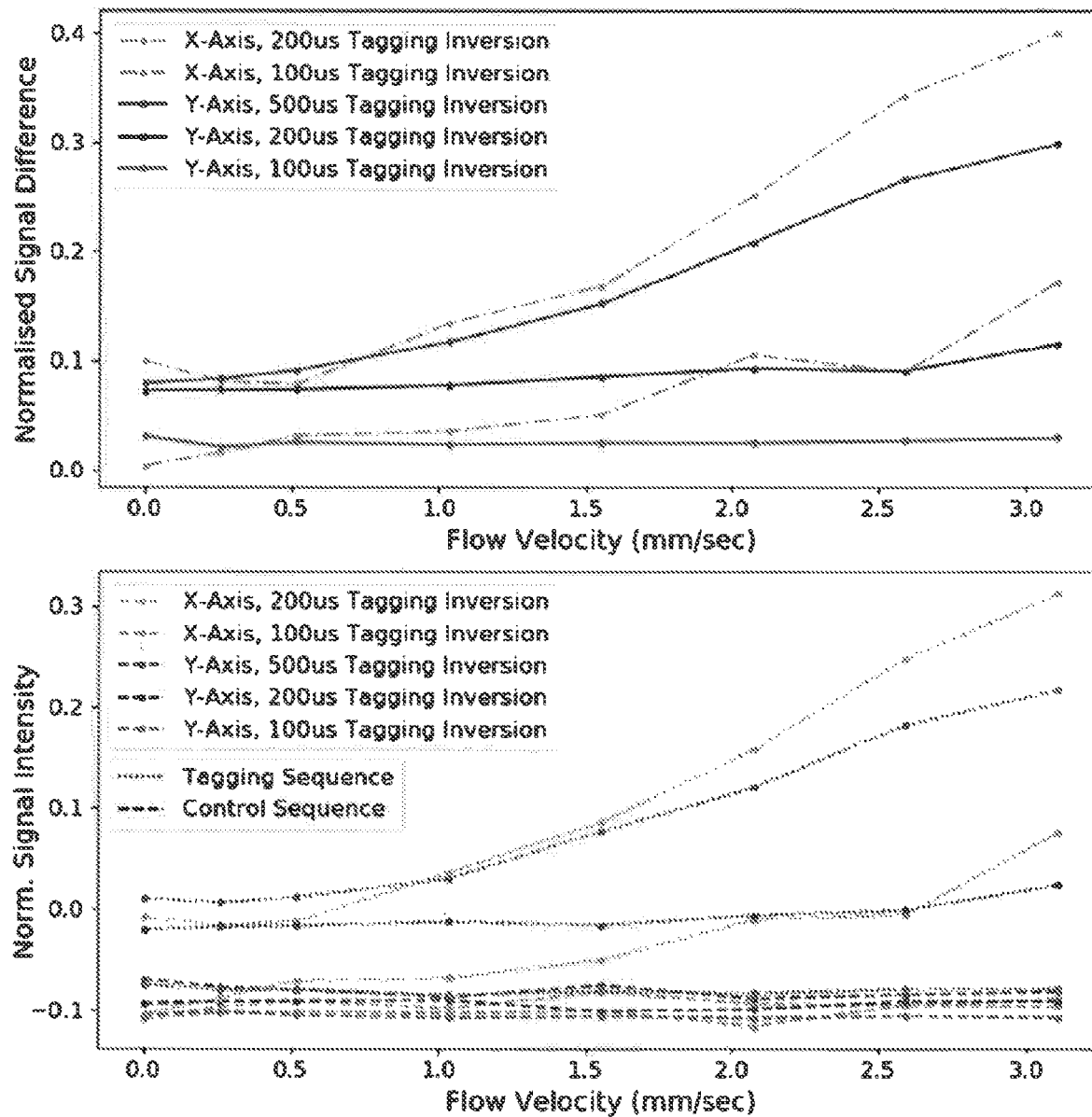

FIG. 16 shows a comparison between flow trends when the pipe is oriented along the homogeneous region (sweet spot) long axis (y-axis) vs perpendicular to the long axis (x-axis). The y-axis configuration is the default, used for other experiments. Measured on CuSO4 doped water with $T_1$=353 plus or minus 5 ms. Experiment parameters: 1500 ms TR, 200 ms TI, 2500 us TE, 32 scans, 30 us control inversion.

Figure 17:
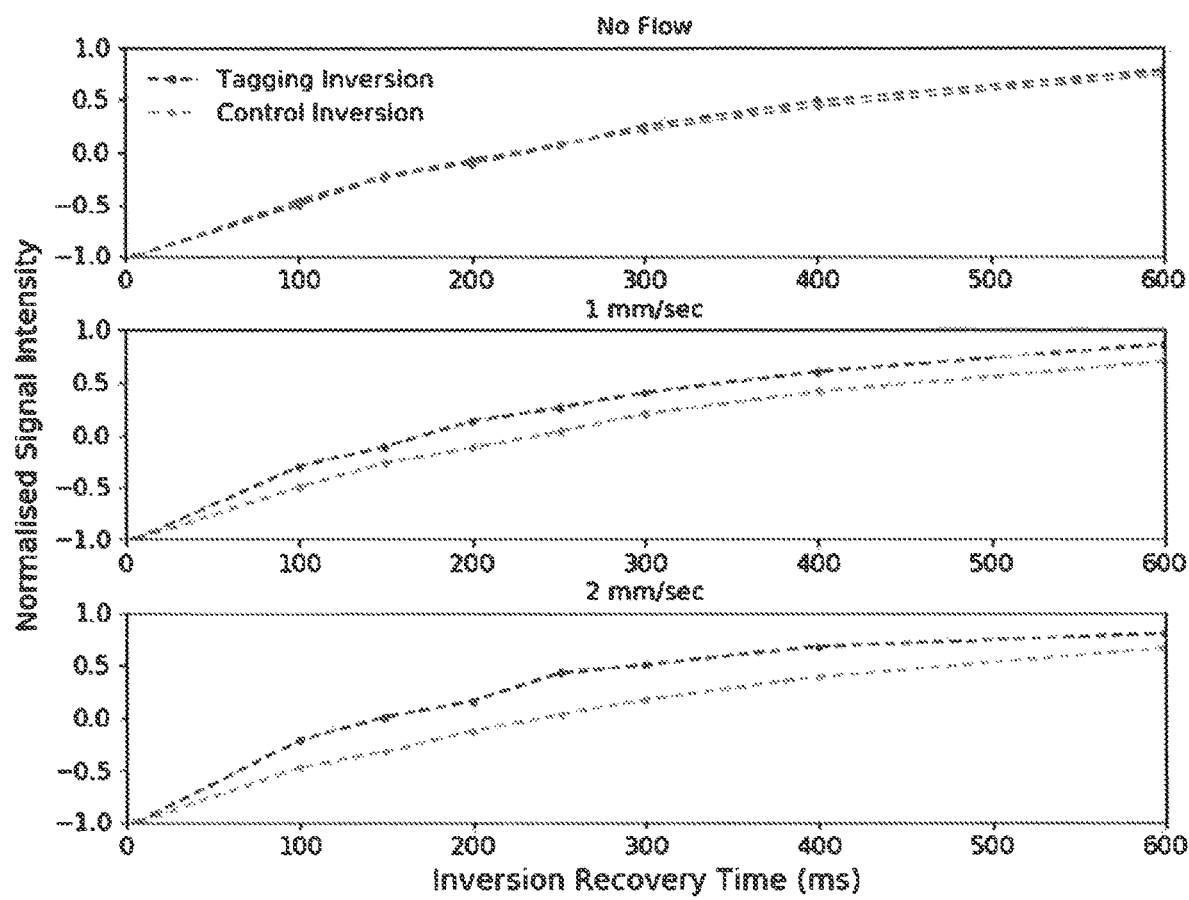

FIG. 17 shows plots of Inversion Time (TI) sweeps at fixed flow velocities. Measured on CuSO4 doped water with $T_1$=320 plus or minus 8 ms. Experiment parameters: 2000 ms TR, 2500 us TE, 8 scans, 500 us tagging inversion, 30 us control inversion.

Figure 18:
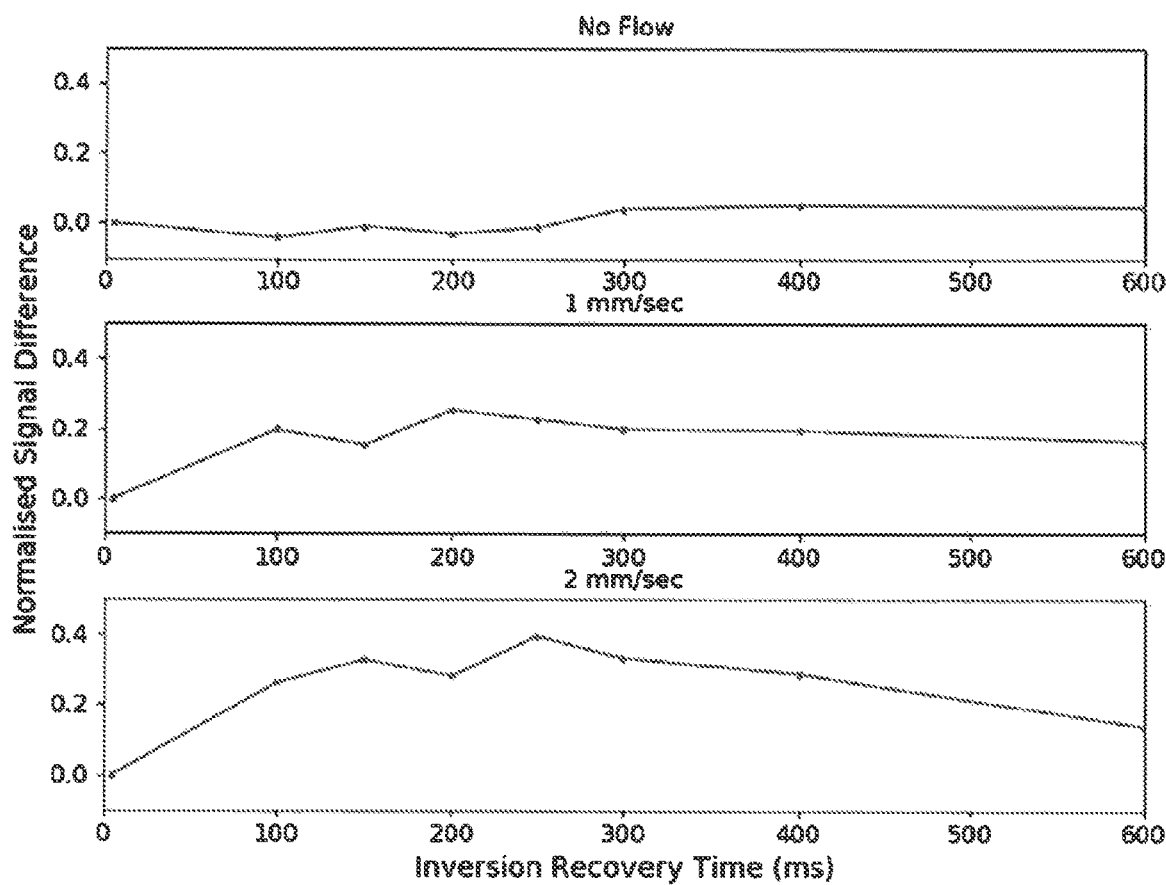

FIG. 18 shows plots of signal difference over Inversion Time (TI) sweeps at fixed flow velocities. Derived from same experiment set as that for FIG. 17.

Figure 19:
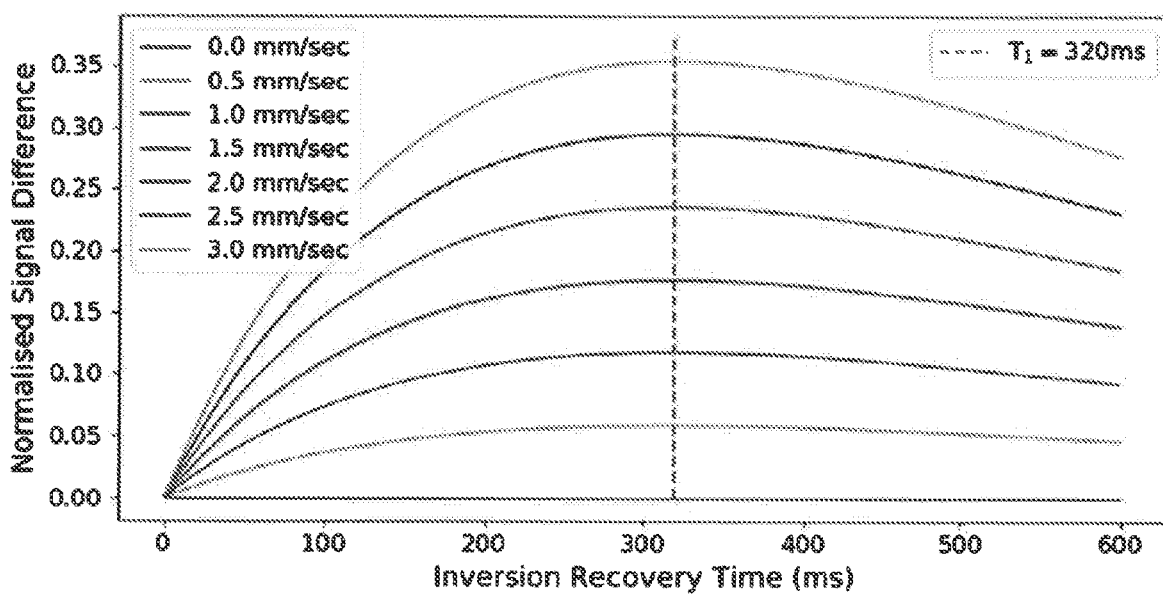

FIG. 19 shows simulated behaviour of signal difference over a range of TI at fixed flow velocities. Vertical marker indicates the $T_1$ value of the simulation.

Figure 20:
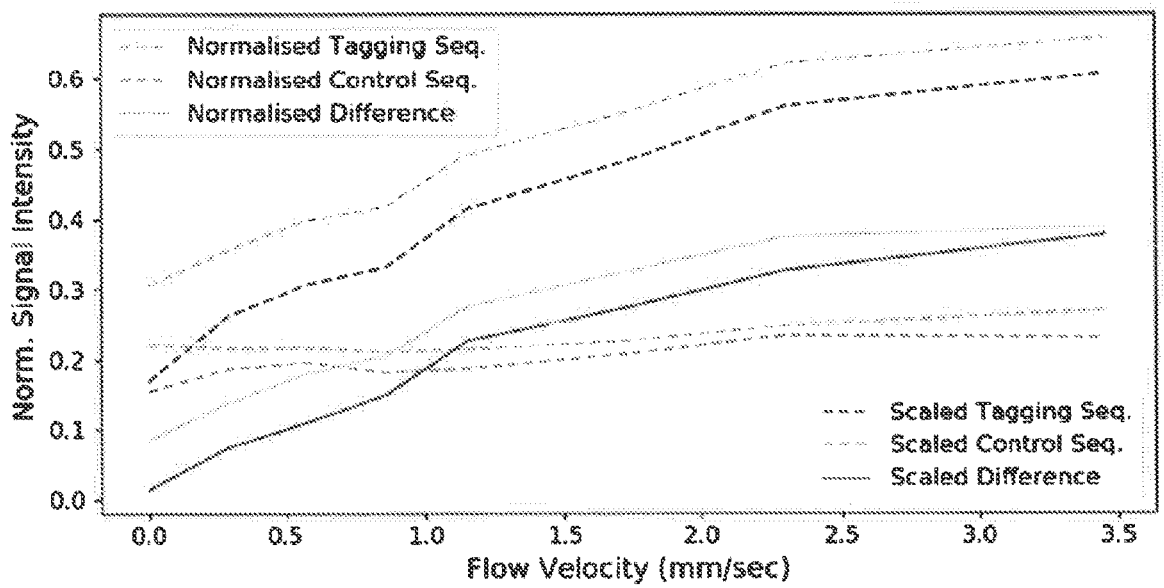

FIG. 20 is a comparison between IFAIR results before and after applying inversion quality scaling. Measured on CuSO4 doped water with $T_1$=320 plus or minus 10 ms, using a foam tissue phantom. Experiment parameters: 2000 ms TR, 300 ms TI, 2500 us TE, 64 scans, 500 us tagging inversion, 40 us control inversion.

Figure 21:
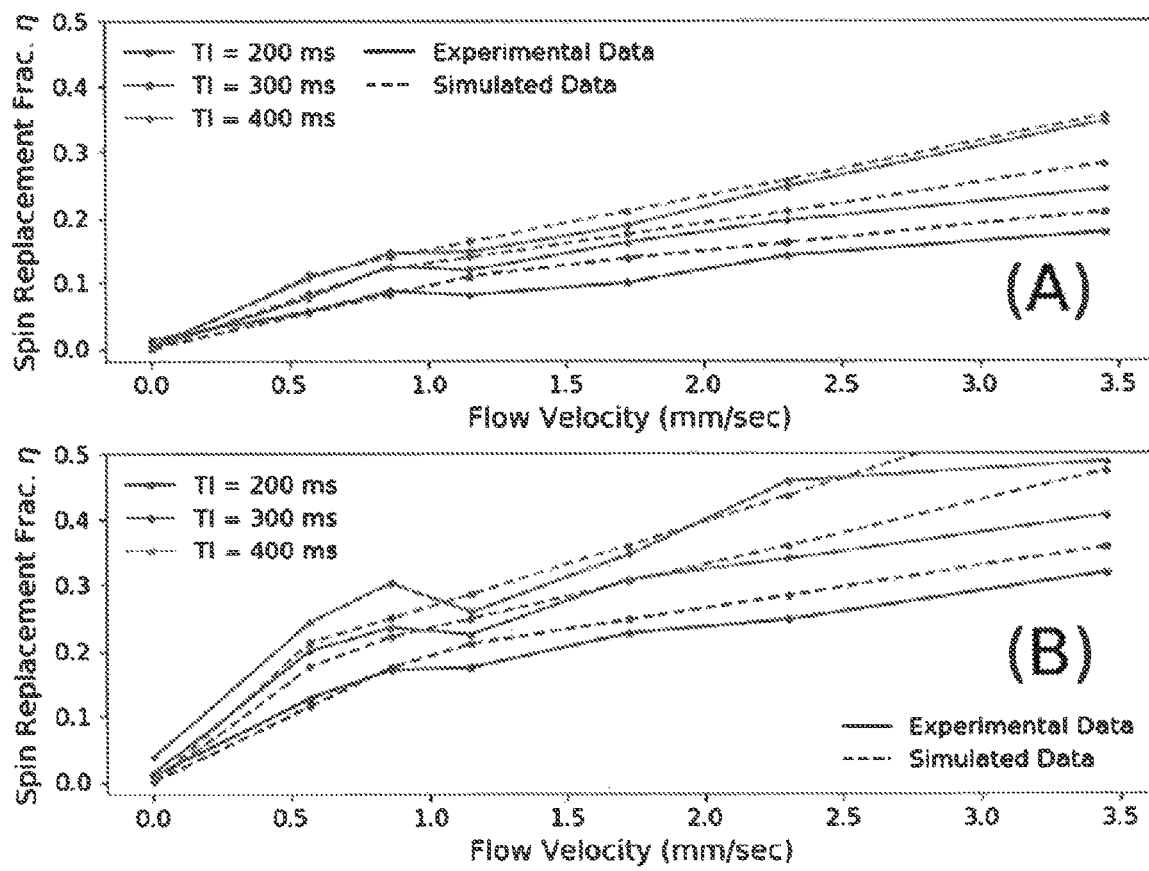

FIG. 21 shows plots of the spin-replacement-fraction vs flow velocity.

Measured on CuSO4 doped water with $T_1$=320 plus or minus 5 ms, using the foam tissue phantom. (A) 250 us tagging inversion. (B) 500 us tagging inversion. Shared experiment parameters: 2000 ms TR, 2500 us TE, 32 scans, 40 us control inversion.

Figure 22:
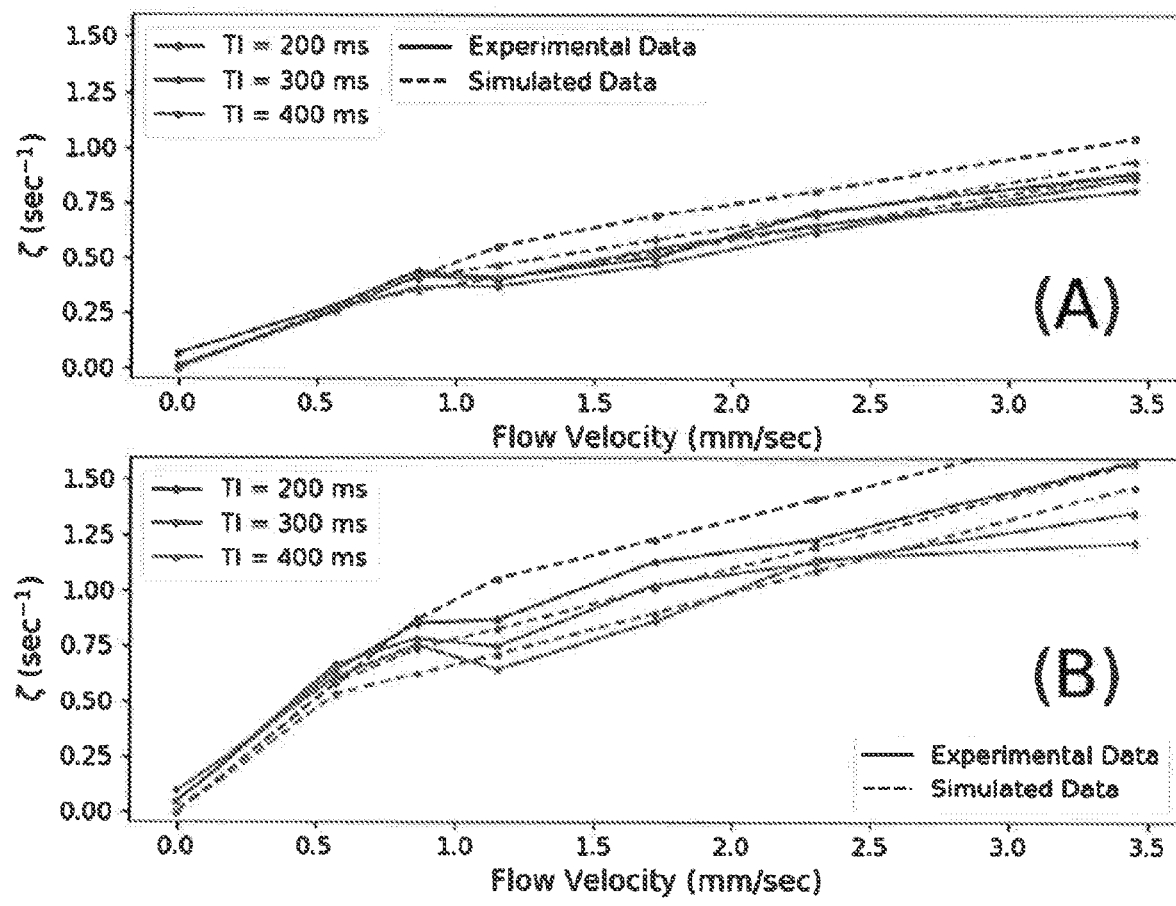

FIG. 22 shows plots of the spin-replacement-fraction-per-second vs flow velocity. (A) 250 us tagging inversion. (B) 500 us tagging inversion. Derived from same experiment and simulation set as FIG. 21.

Figure 23:
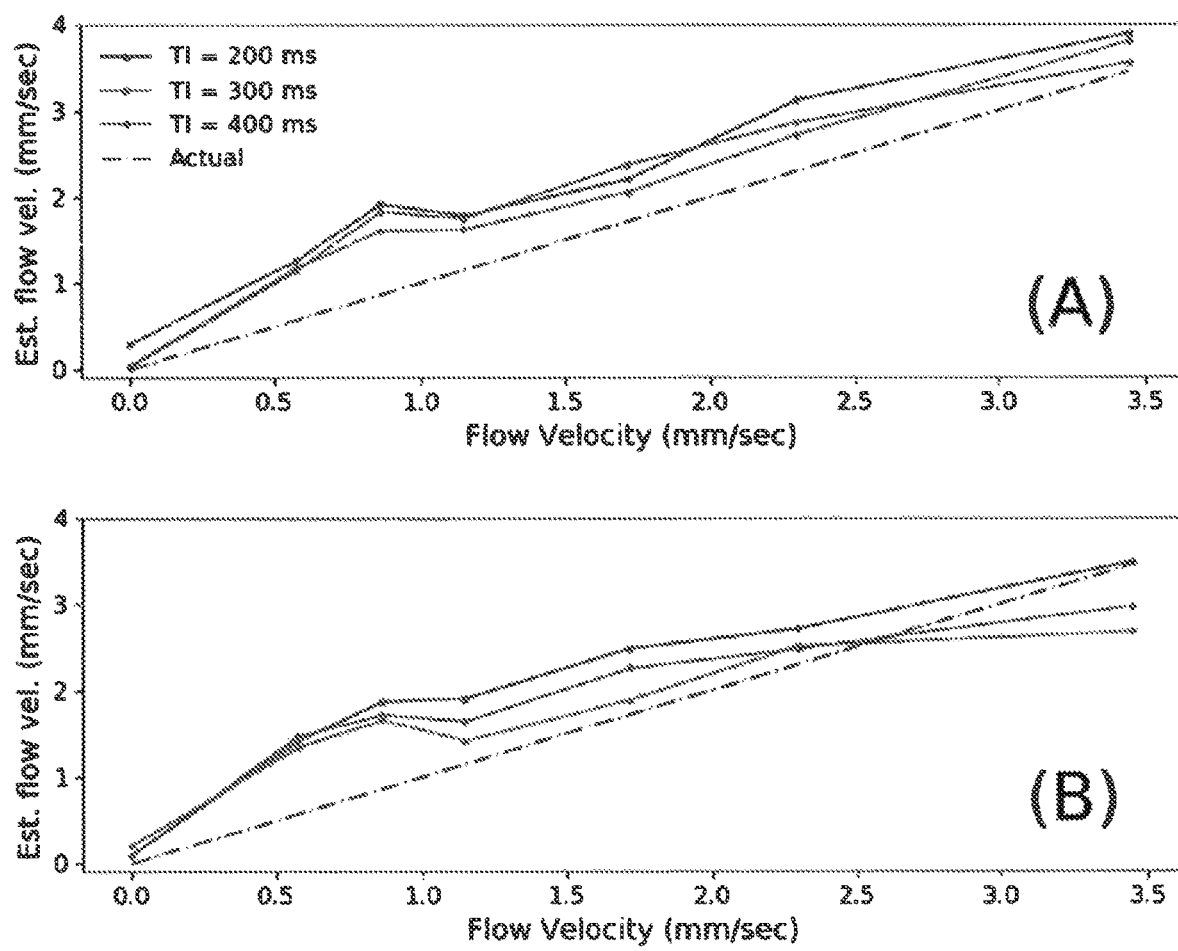

FIG. 23 shows plots of the estimated flow velocity derived from the NMR signals vs the directly measured flow velocity. (A) 250 us tagging inversion. (B) 500 us tagging inversion. Derived from same experiment set as FIG. 21.

Figure 24:
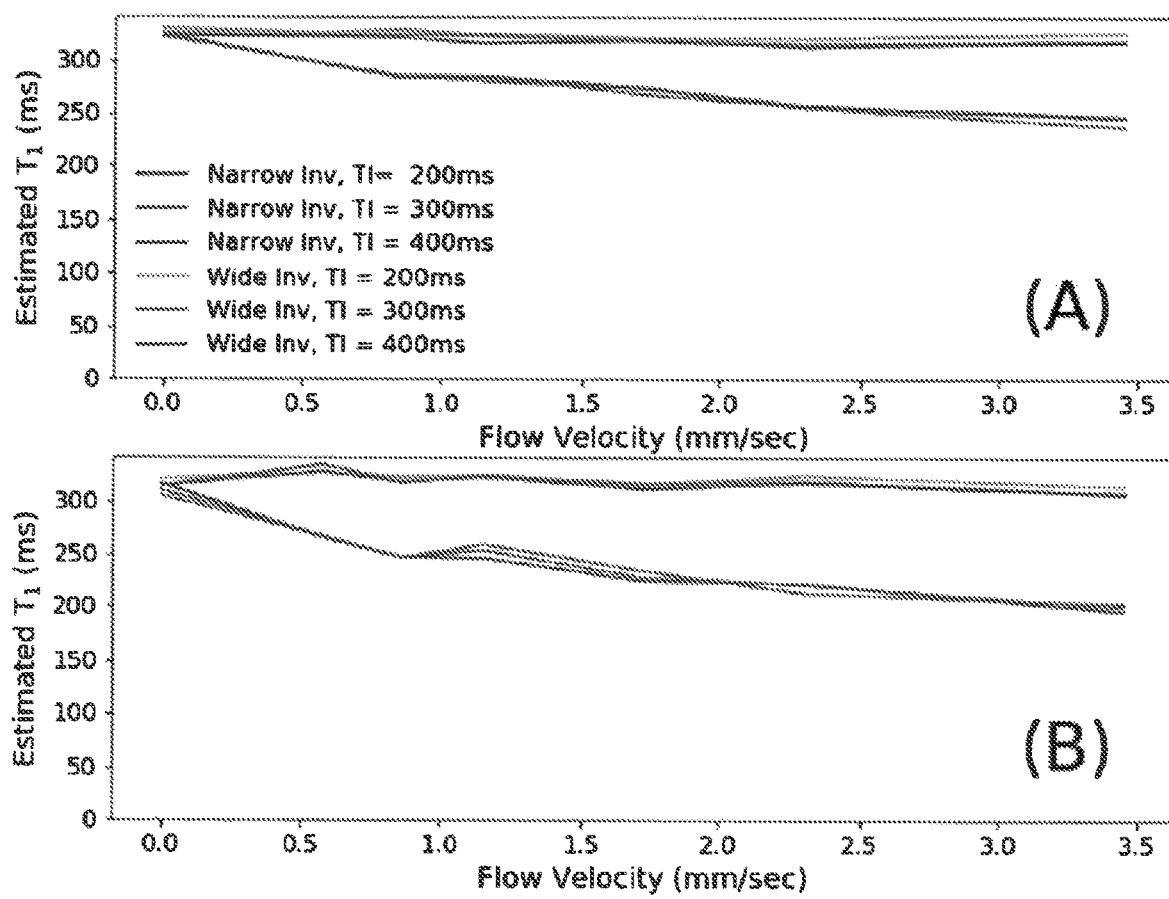

FIG. 24 shows estimates of uncompensated $T_1$ (tagging sequence) and flow-compensating $T_1$ (control sequence). (A) 250 us tagging inversion. (B) 500 us tagging inversion. Derived from same experiment set as FIG. 21.

Figure 25:
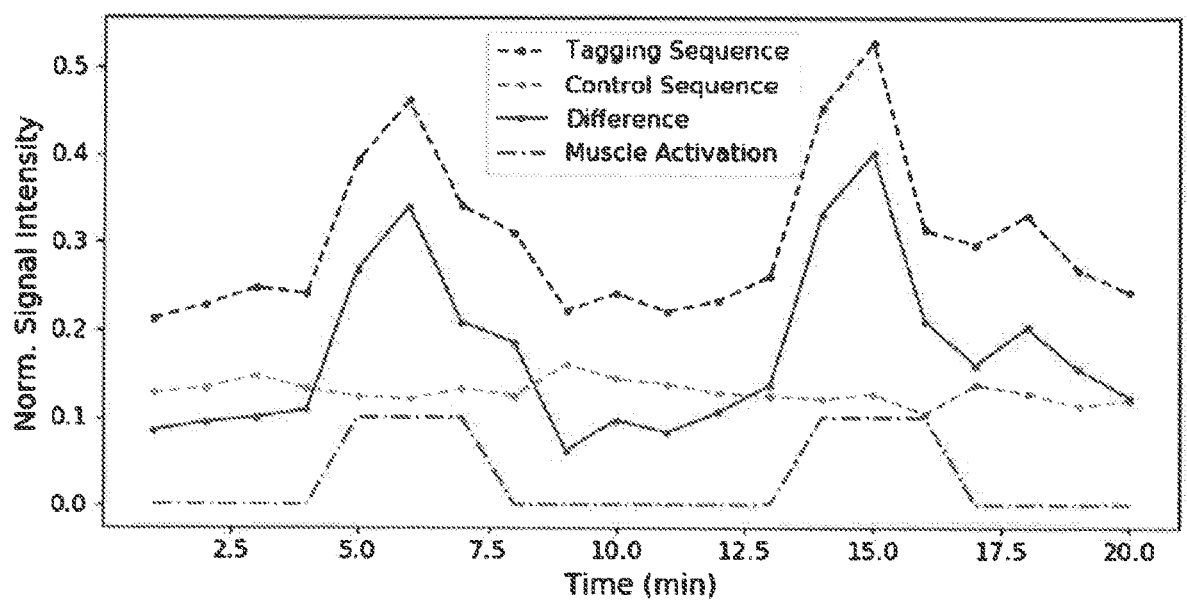

FIG. 25 shows tagging and control sequence signals over time, measured in-vivo and scaled to remove effects due to inversion quality.

Experiment parameters: 2000 ms TR, 300 ms TI, 2500 us TE, 8 scans, 500 us tagging inversion, 40 us control inversion.

Figure 26:
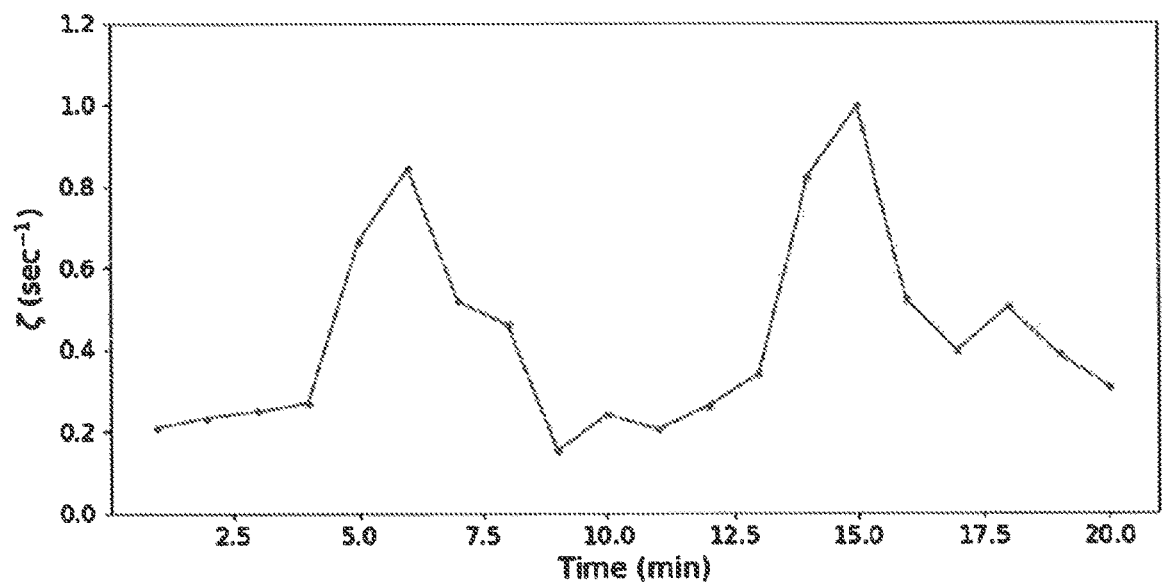

FIG. 26 shows estimation of the spin-replacement-fraction-per second calculated from the scaled in-vivo experimental data. Derived from same experiment as FIG. 25.

Figure 27:
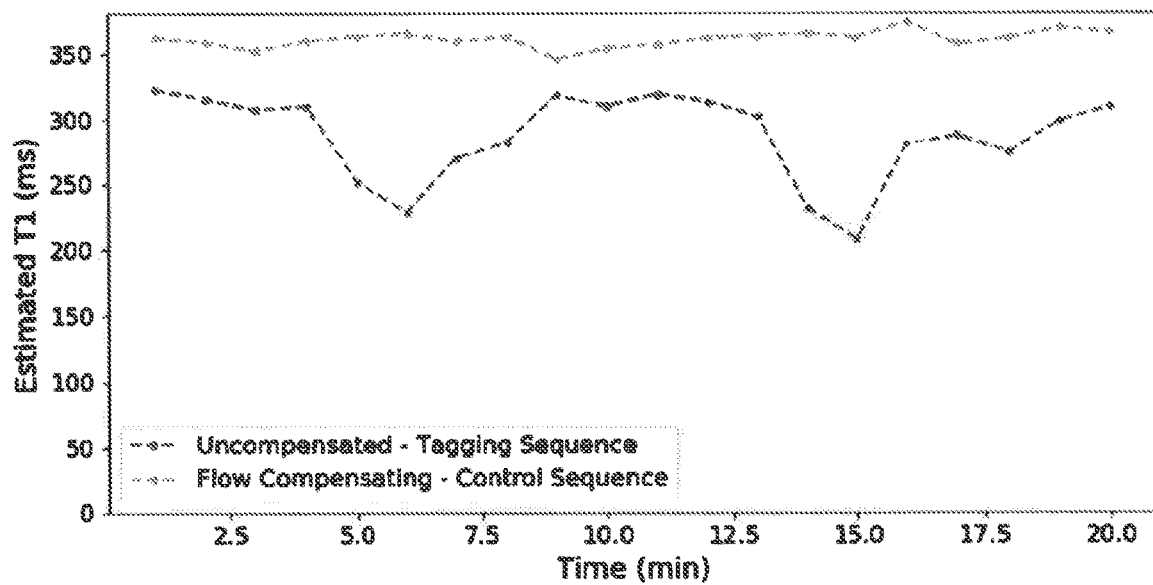

FIG. 27 shows estimation of flow-compensating and uncompensated bulk $T_1$ values, calculated from the scaled in-vivo experimental data. Derived from same experiment as FIG. 25.

Figure 28:
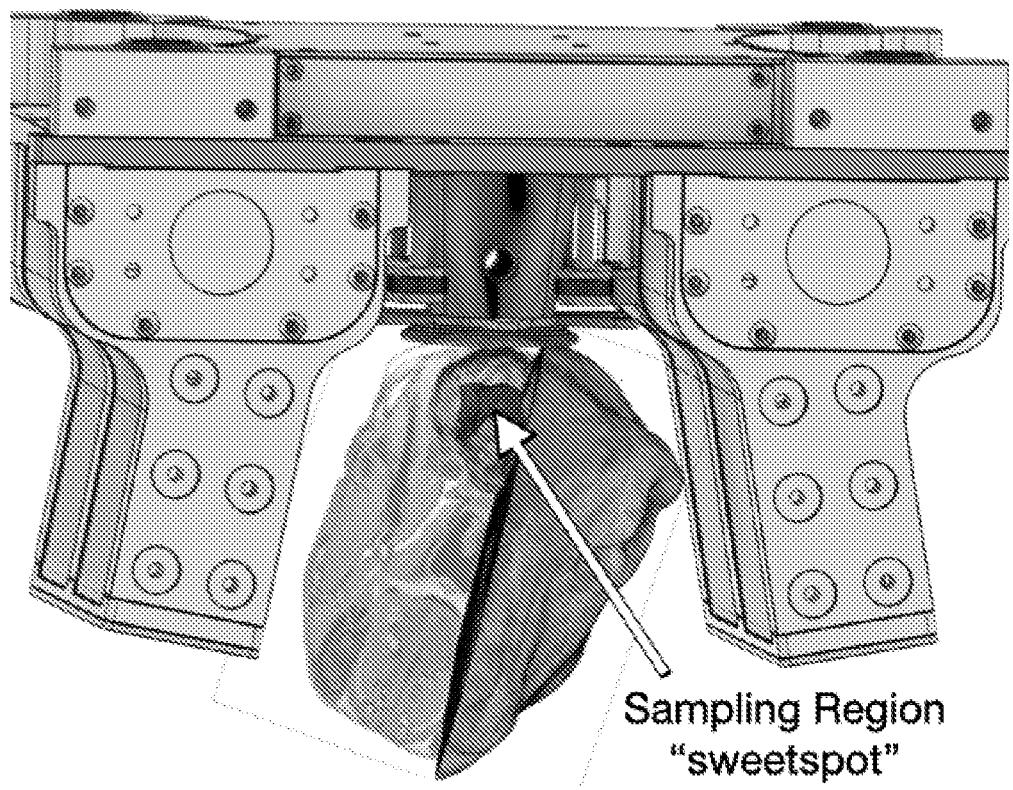

FIG. 28 shows the magnetic structure of FIGS. 2 to 6 and 8.

Figure 29:
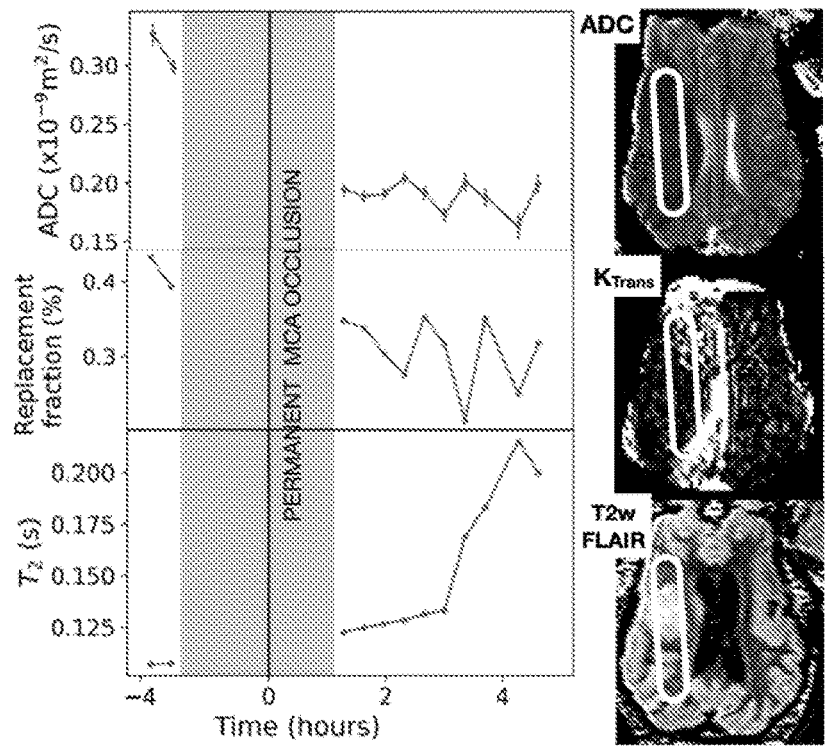
Figure 29:
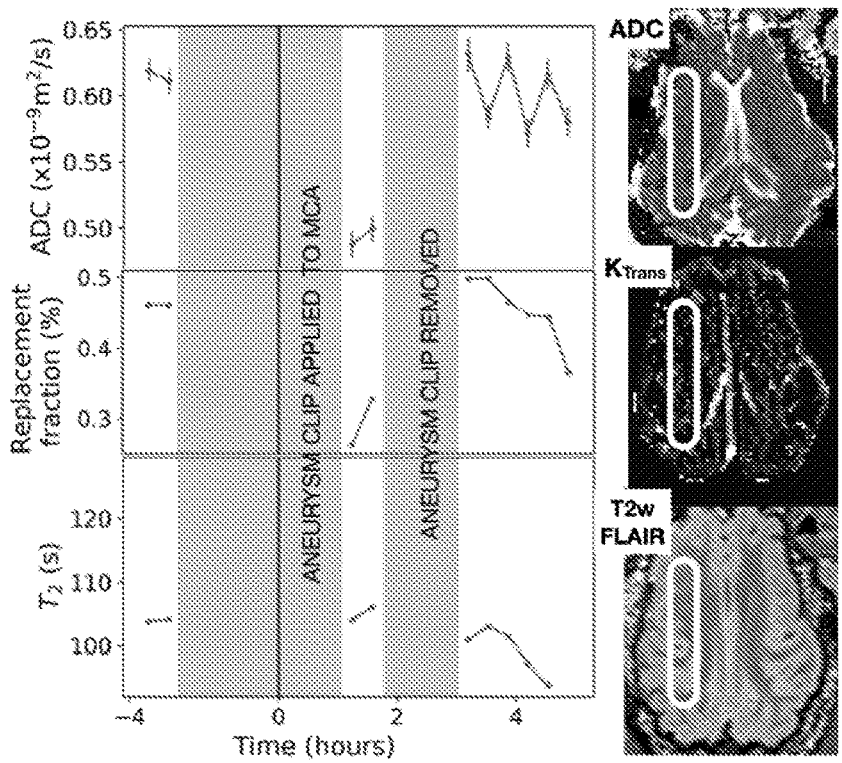

FIGS. 29A and 29B show the results obtained for the magnetic structure of FIG. 28 for a permanent group (permanent insult model) (FIG. 29A) and a transient group (transient stroke model) (FIG. 29B).

DETAILED DESCRIPTION

The apparatus or device described in this specification can be used in a variety of applications, some of which may not be medically related. However, for the purposes of describing the device and/or method disclosed, reference will be made by way of example to use of the disclosure in apparatus that can detect or monitor flow, specifically blood flow in tissue in selected regions of a human or animal body. Such regions may be, without limitation, limbs and/or organs (for example the brain).

The brain is one organ where non-invasive techniques are of paramount importance. Brain tissue health, i.e., brain oxygenation, blood perfusion and diffusion parameter (used as a marker for cell damage), information is often required. Devices that are possible according to the present disclosure may operate based on application of time domain relaxometry using Nuclear Magnetic Resonance (NMR) technology. A significant benefit is that the magnetic structure(s) disclosed herein uses a low field strength (0.25 T), producing a small homogeneous region (sweet spot) that is between about 2 and 5 cm$^3$.

The configuration of the magnetic field is not designed for Magnetic Resonance Imaging (MRI). MRI magnets are very high field strength magnets that are configured for imaging applications. A uniqueness of the magnetic structures as described herein is in the reduced field strength, which sacrifices imaging capability, to provide near real-time information measurement or monitoring information.

The present disclosure allows apparatus to be constructed which has a significantly reduced form factor, and which provides portability in a system weighing about 25-30 kg. By reducing the size of the magnetic structures, it becomes possible to drive significant reductions in the cost of manufacturing such a device while still providing clinically valuable information.

Figure 1:
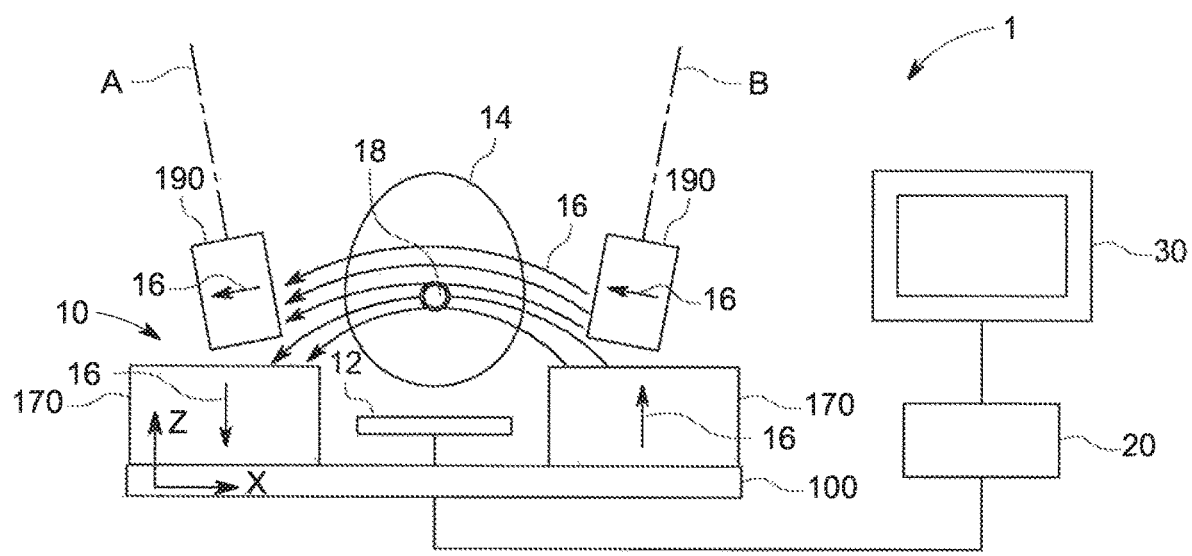
FIG. 1 is a diagrammatic view of an example of a non-invasive monitoring or detection system.

Referring to FIG. 1, an example of a system, which is generally referenced 1, according to one embodiment of the disclosure is shown diagrammatically. The system 1 includes a magnetic structure which is generally referenced 10, a controller 20 and a user interface 30. The magnetic structure 10 includes a coil 12, and the arrangement and operation of the magnetic structure 10 and coil 12 will now be described below in further detail.

The controller 20 may include more than one component or module. For example, a power supply to energise the coil 12 may be provided separately, or may be provided as part of the controller 20 or the coil 12. The controller will typically include a computer module or a microprocessor, or field-programmable gate array (FPGA) or similar device programmed with, or configured to execute control instructions embodied in software to perform the necessary control functions which are described further below.

The processor used to perform the control functions may in some embodiments take the form of a general-purpose computer, such as a laptop or tablet. Such a device may also provide the user interface 30, which may for example include a touchscreen.

As will be seen from FIG. 1, the magnetic structure 10 is designed to provide a constant magnetic field and to be sufficient in dimension to accommodate or receive a head (such as a human head), which is shown in outline referenced 14. In this diagram, head 14 is seen from the top of the head, that is to say the patient is lying prone along a longitudinal axis (the y axis according to the drawing figure) directed into the page.

The portable magnet systems (portable magnetic resonance (MR) system) according to the present disclosure, such as magnetic structure 10 has been designed and built to allow NMR to be used to detect and monitor tissue parameters in organs such as the human brain. In particular, systems according to the present disclosure may measure T2 changes due to blood oxygenation in the brain. This requires a strong magnet optimised $B_0$ field strength with low form factor, high homogeneity (low magnetic field gradients), and a homogeneous region (sweet spot) deep enough that can reach most regions of the brain. The term "homogeneous region", "sweet spot" or "homogeneous region (sweet spot)" in this sense refers to a region of substantially homogeneous field strength throughout a tissue test volume sufficient for the detection or monitoring of one or more parameters via NMR. Referring to FIG. 1, the shape and direction of the magnetic field created by the magnetic structure 10 is illustrated by arrows 16. The field provides a homogeneous region (sweet spot) 18 within patient head 14. The dimensions of the homogeneous region (sweet spot) may be varied by adjustment of the magnetic assembly, as will be described further below. In one embodiment the spot is about 10 mm wide by about 10 mm high and about 50 mm along the y-axis. In other embodiments, the dimensions vary between approximately 5 mm to 50 mm in each dimension.

The magnetic structure 10 is designed to fit or accommodate an average human head, while keeping the face accessible. The magnetic structure 10 and system as a whole is also designed to be compact and light enough to be easily moved. Those skilled in the art will appreciate that the magnetic structure 10, which is sufficient to accommodate a human head, will also be capable of accommodating other body parts or organs, for example many joints, and part of limbs, along with possibly being placed about parts of the torso to enable non-invasive detection or monitoring of tissues of a variety of different organs.

Assembly of the magnetic structure 10 will now be described. In the embodiment shown, design of the magnetic structure was constrained by the largest and strongest magnets available from the manufacturer. The main magnet assembly uses eight 90×90×50 mm (width×depth×height) Neodymium magnets. Optimisation of magnet placements by simulations showed that this design can produce a 0.25 T homogeneous region (sweet spot) approximately 30 mm above the magnet surface. This spot is about 10 mm wide by about 10 mm high and about 50 mm along the y-axis. Those skilled in the art will appreciate that the magnetic structure 10 can itself be adjusted to change the dimensions of this homogeneous region (sweet spot), as described further below. Also, the magnetic structure 10 has been configured to allow changes in position of the body part that it receives relative to the magnetic structure in order to adjust the position of the homogeneous region (sweet spot) in the tissue under observation. This further includes being able to change the position of the coil 12, as is described further below.

In the embodiment shown, the performance of the magnetic structure 10 was simulated in COMSOL Multiphysics (Burlington MA, USA), which uses the finite element method to solve Laplace's equation for magnetic scalar potential. This allows accurate modelling of the effect of the high permeability magnet yoke. The magnet designs can be refined by sweeping through different values for the design parameters in COMSOL and optimising the generated field for the homogeneous region (sweet spot) position, strength and field homogeneity.

Figure 2:
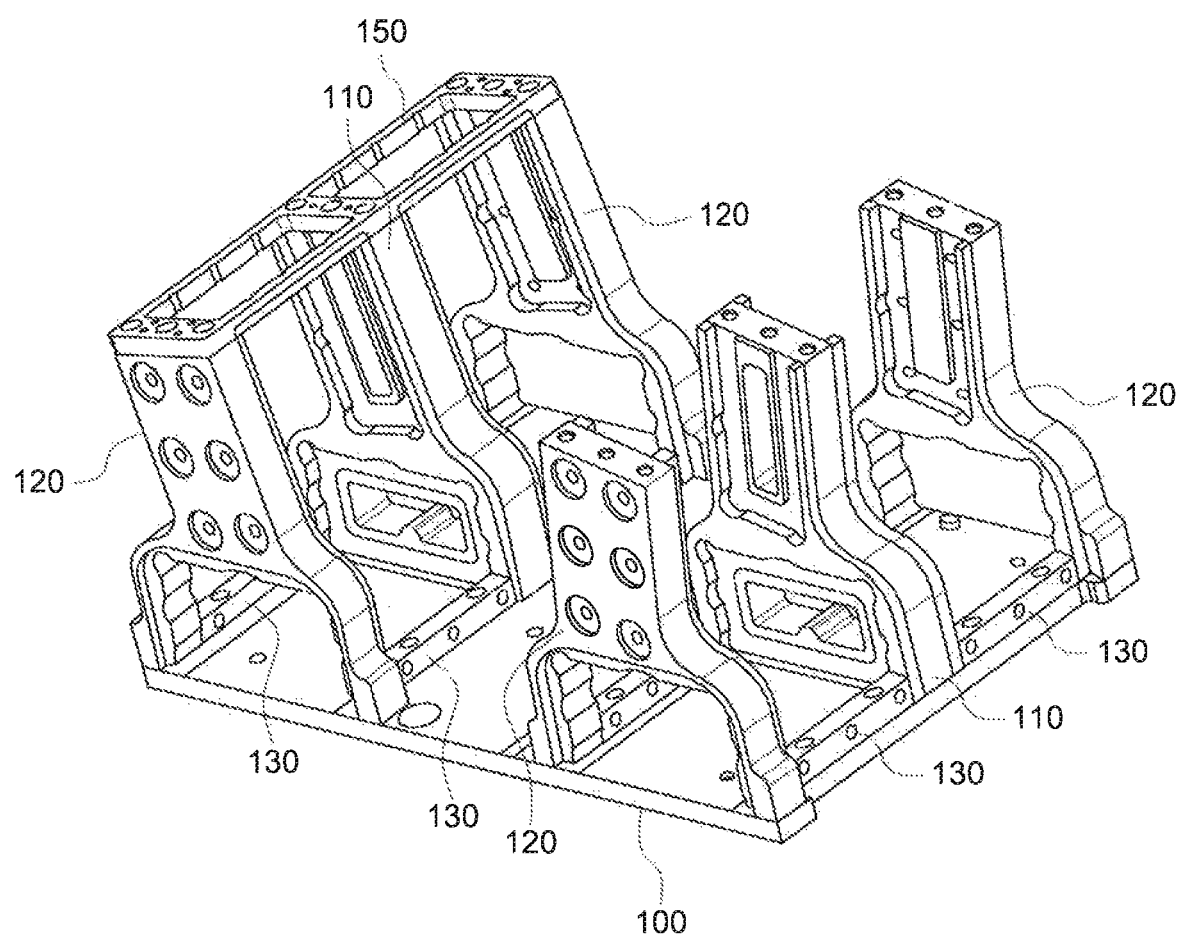
FIGS. 2 to 6 are isometric views of stages of one embodiment of a magnetic structure.

Referring to FIG. 2, further aspects of the magnetic structure 10 are shown, including non-magnetic (e.g., aluminium) centre supports 110 which are mounted on to yoke base 100, which is made from magnetic steel for example grade 1010, 1016, or similar, that has been milled to specification. Side supports 120 are attached to the yoke 100, followed by guide rails 130 which ensure the base magnets are positioned properly. Top brackets 150 secure or support the distal or upper ends of supports 110 and 120.

Figure 3:
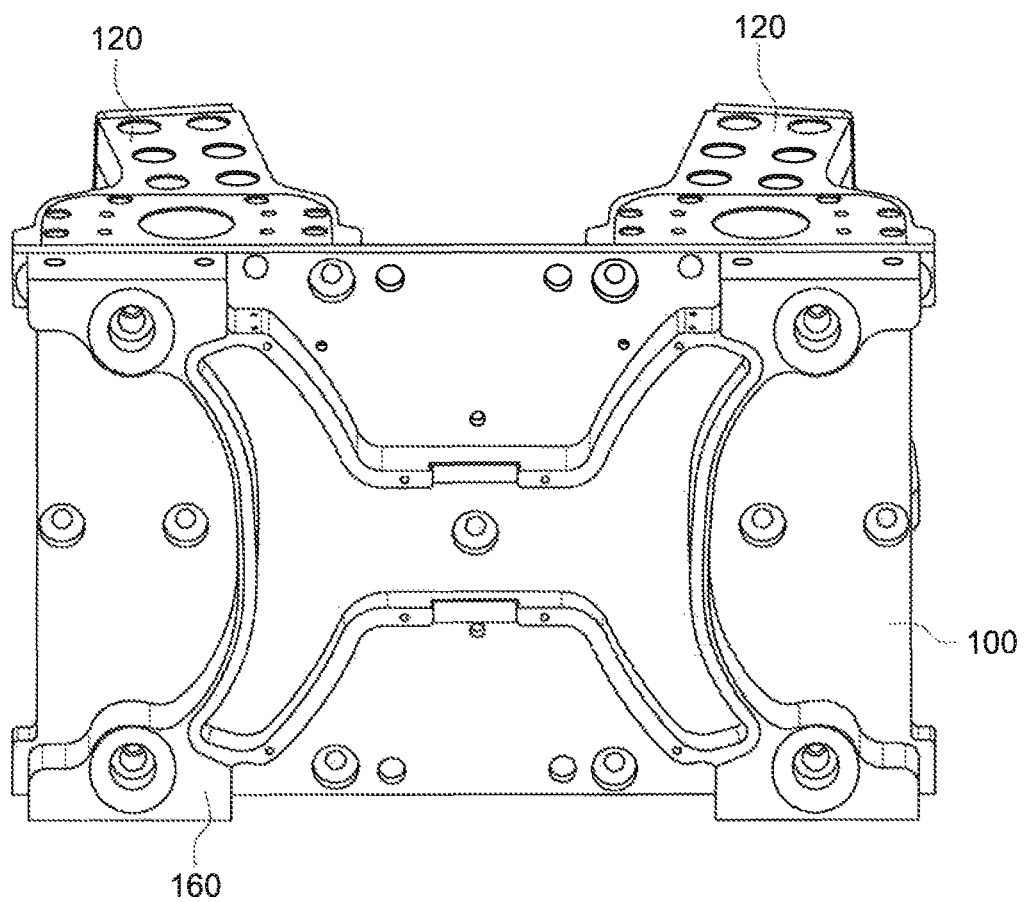

As shown in FIG. 3, magnet base 160 provides additional rigidity to the base to prevent the magnetic structure, including yoke base 100, from flexing under the influence of the magnets.

Figure 4:
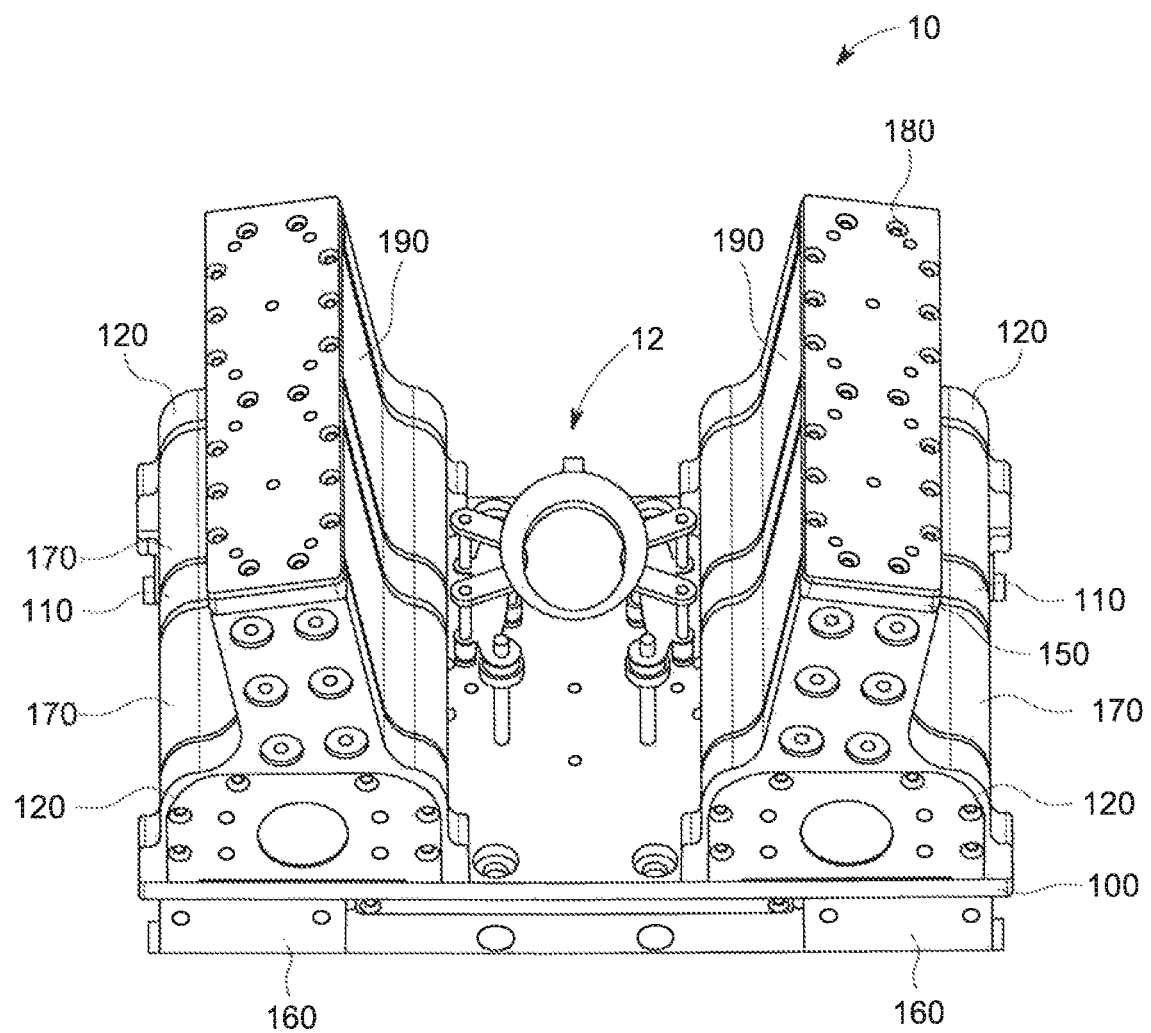
Figure 5:
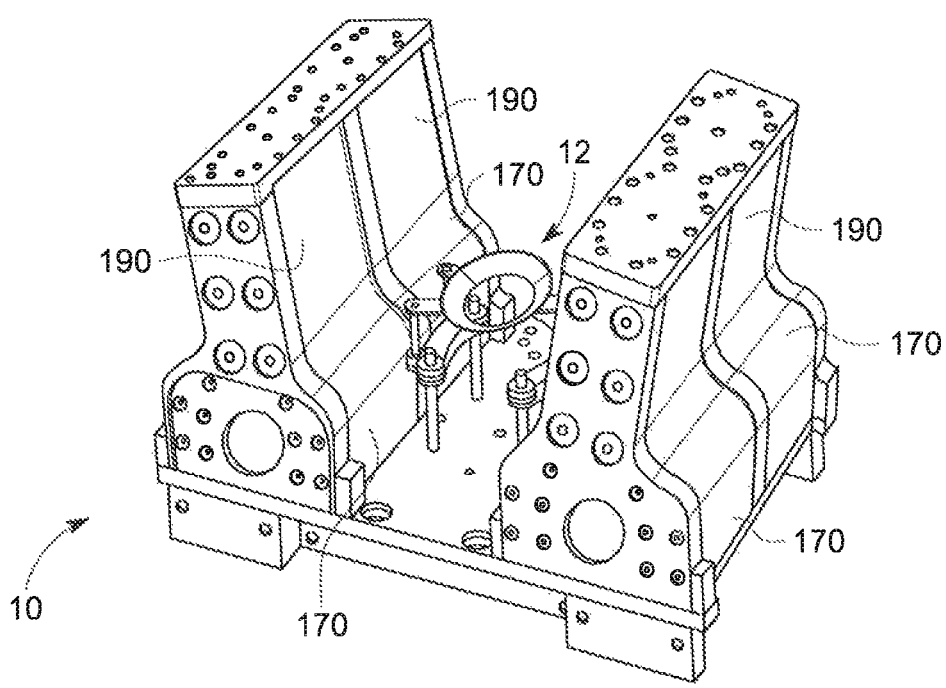
Figure 6:
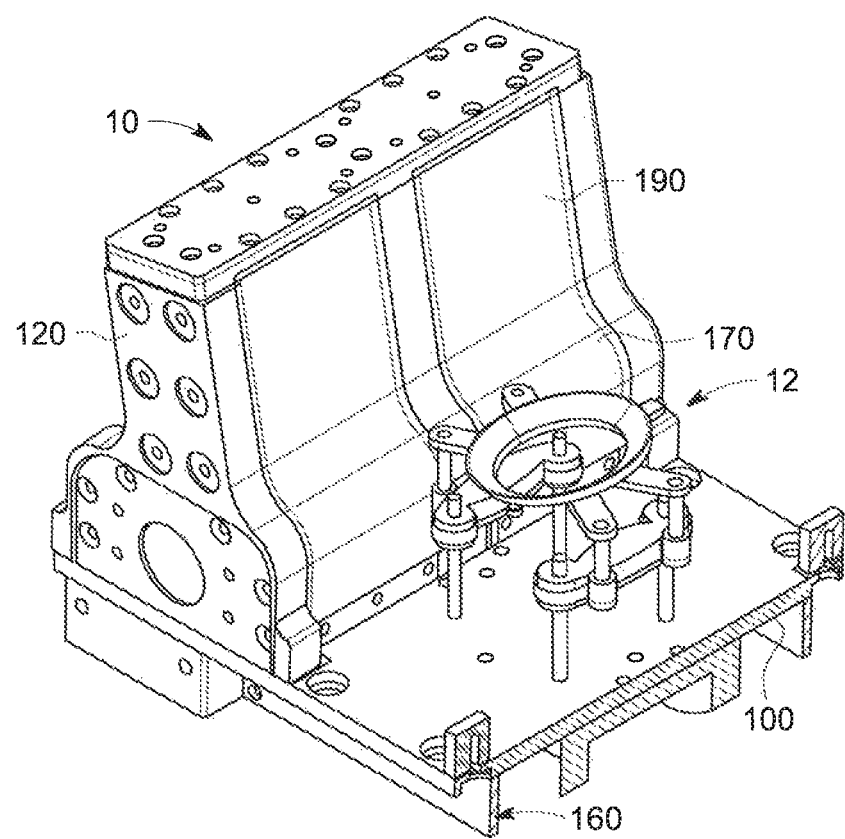

Further aspects of the magnetic structure 10 are shown in FIGS. 4 to 6. These Figures also show the coil assembly 12, which is described further below with reference to FIG. 8.

Base magnets 170 are accommodated or secured in place between the supports 110 and 120 near the base regions of the supports i.e., the base magnets 170 are provided proximate or proximal to the base 100. The upper or wing magnets 190 are located at an upper region of the supports 110, 120, so that they are located distal from base 100.

Figure 1A:
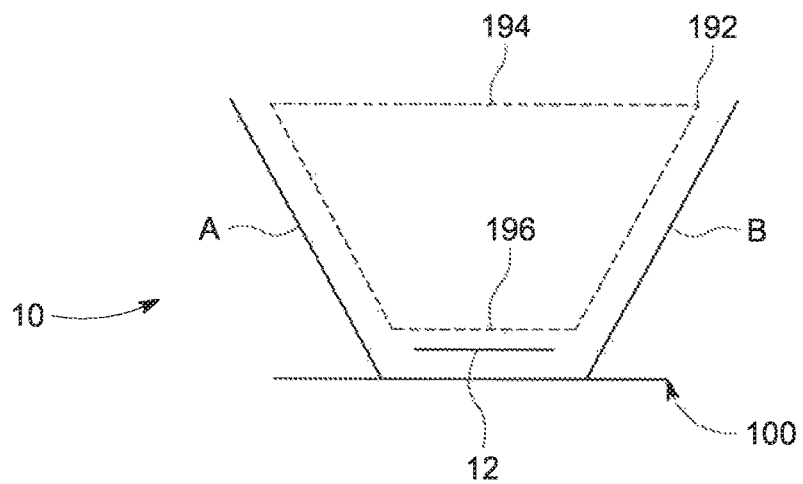

The completed magnetic structure has two side walls A and B (as shown in FIGS. 1 and 1A) formed by the supports 110 and 120, or formed by the magnets 170, 190, or formed by the combination of the supports 110, 120 and magnets 170, 190. In one embodiment the walls A and B may be parallel to each other, or substantially parallel, or angled toward each other. In other embodiments, such as the embodiment illustrated, the walls A and B are angled away from each other, forming a channel 192 (illustrated in broken lines in FIG. 1A) whereby the mouth 194 of the channel (at the top of the magnetic structure) is wider than the base 196 of the channel.

In some embodiments, such as the embodiment illustrated, the base magnets and wing magnets have a longitudinal (i.e., in the y axis according to FIG. 1) extent or dimension that is greater than their transverse (i.e., in the x axis according to FIG. 1) extent or dimension. In some embodiments, the base of one or both of walls A and B has a greater transverse dimension at the base than the top i.e., one or both walls are thicker at the base than at the top, so that they are thicker nearer the base 196 of channel 192 than they are at the mouth 194 of channel 192. In some embodiments, such as the embodiment illustrated, the walls A and B include a plurality (two or more) individual base magnets 170 and wing magnets 190 in the a longitudinal (i.e., in the y axis according to FIG. 1) direction.

Figure 7A:
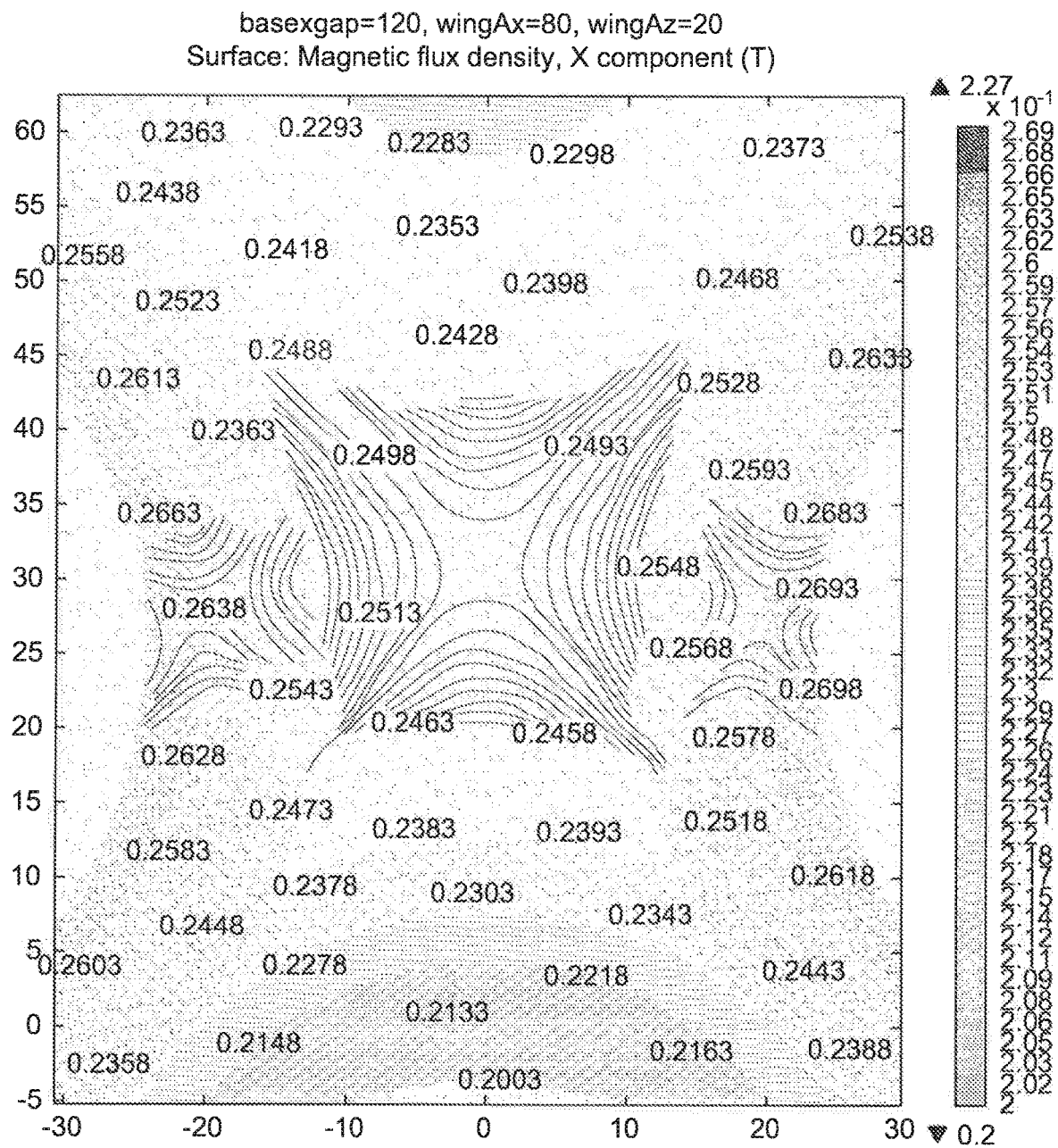
FIGS. 7A and 7B are magnetic field plots for the magnetic structure of FIGS. 2 to 6.
Figure 7B:
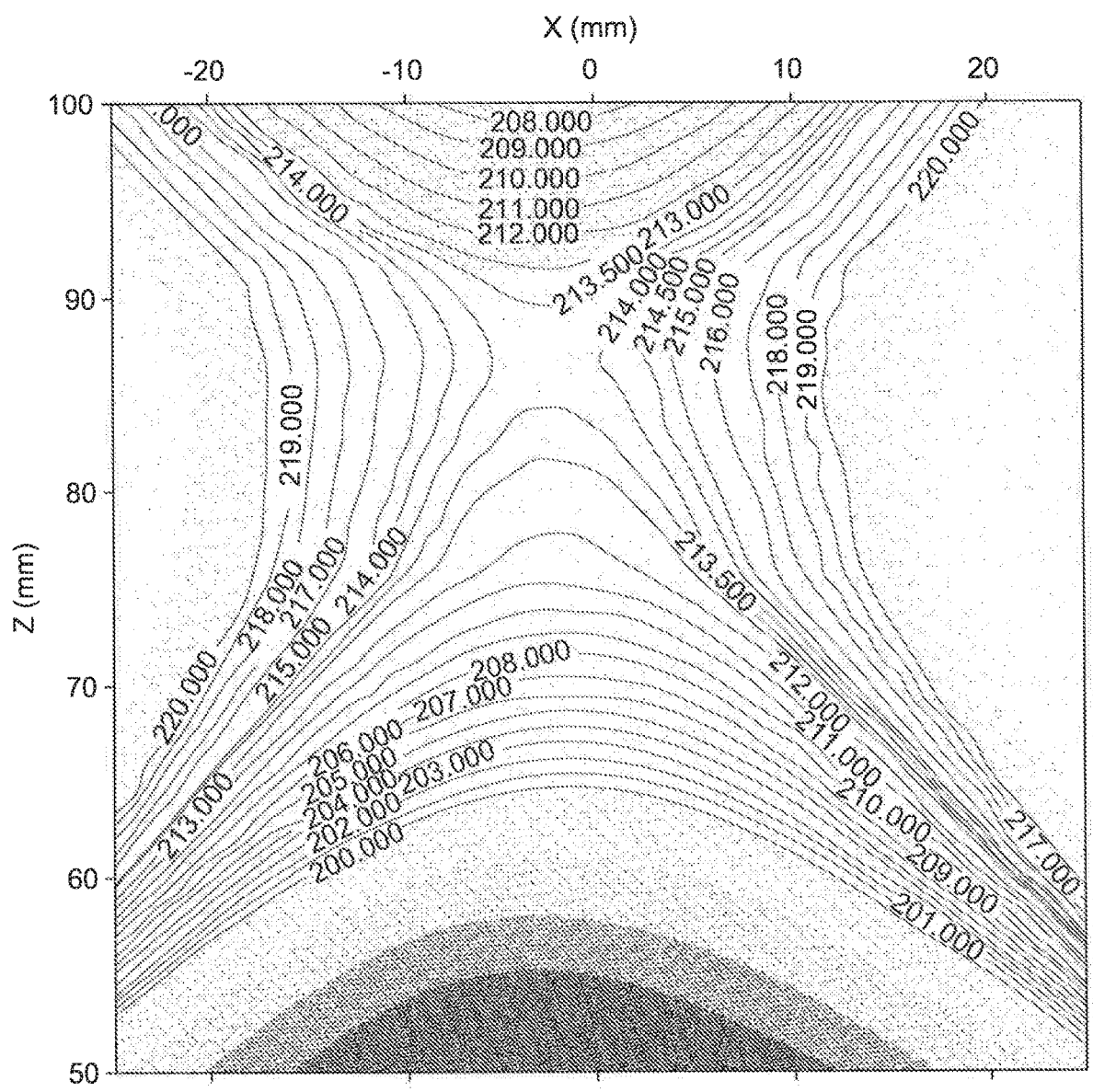

FIG. 7A shows a COMSOL simulated Magnetic Field of the apparatus of the preceding Figures. FIG. 7B shows the measured magnetic field produced by a magnetic structure according to the embodiment illustrated in FIGS. 2 to 6, using an inhouse built 3-axis field mapper system.

The aluminium frames 120, 130 hold the magnets 170, 190 in place along with the iron steel yoke 100 and are configured to hold the magnets in place and resist the 700 N attractive forces affecting the two wing magnets 190. The frame structure spaces the magnets and provides channel 192 which includes open space into which a body part can be received for non-invasive analysis, detection or monitoring. In some embodiments, the supports 110 and 120 are slidably and/or pivotally mounted relative to base 100, so that the channel can be widened (or narrowed) to provide more (or less) access room by moving the wing magnets 190. If the magnets are moved further apart, then more space is provided to accommodate a larger head or other body part, but at the expense of field strength and a slight decrease in the position of the homogenous region (sweet spot). Moving the wing magnets 190 closer together will increase the field strength and raise the position of the homogeneous region (sweet spot). Thus, the magnets can be adjusted to alter the homogeneous region (sweet spot) as required for positioning relative to tissue and/or for changing the size and field strength of the homogeneous region (sweet spot).

Figure 8:
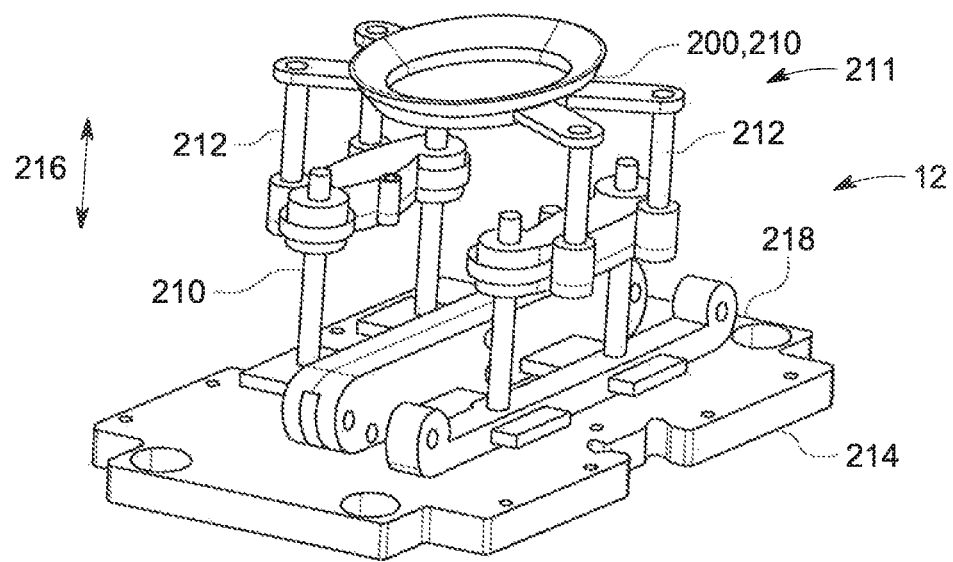
FIG. 8 is an isometric view of a radiofrequency (RF) coil support and adjustment apparatus for use with the magnetic structure of the preceding figures.

As mentioned above, NMR systems use a constant magnetic field (in this example provided by magnets 170, 190) but also rely on a weaker oscillating field. Referring to FIG. 8, this oscillating field is provided by a radiofrequency (RF) coil, such as coil 200 of coil assembly 12, which is used to generate $B_1$ magnetic field in order to excite the spins and detect transverse magnetisations of spins. The RF coil 200 and related electronics disclosed herein are similar to that of other NMR and MRI instruments.

RF coil assembly 12 used in some of the embodiments disclosed herein consists of an RF coil 200 which is effectively an RLC circuit resonating at the Larmor frequency of the protons at the magnetic field of the homogeneous magnetic region. The circuit is tuned and matched using variable capacitors to achieve a voltage standing wave ratio (VSWR) value of 1:1.43 (Return Loss 15 dB). The pick-up coil 210 is a 3 turn oval shaped solenoid made of tinned copper wire 1 mm in diameter and wound on a 3D printed part suited to accommodate the shape of the head. RF coil 200 is supported on telescoping or length adjustable pillars 210 and 212 and can be moved up and down relative to base platform 214 as indicated by arrows 216 in order to accommodate different size objects. The RF coil assembly 12 can also be moved in order to change the spatial position e.g., penetration depth at which the signal is acquired from.

Shim magnet assembly 218 on the bottom which is in some embodiments provided beneath base 100 moves up and down as well as side to side in order to adjust the homogeneity of the magnetic field $B_o$.

Shimming magnets assembly 218 are in some embodiments located in two trays underneath the RF coil and are attached to movable platform 214 which can translate the shim magnets assembly 218 up, down and side to side in order to improve homogeneity of $B_o$ magnetic field. The homogeneity improvement can be measured in a number of ways but is typically measured using either 1) A 3-axis field mapper with a Hall effect probe or 2) NMR techniques using for example a large sample of doped water with a long and observing the effective $T_2$ using a Carr-Purcell-Meiboom-Gill (CPMG) experiment.

The shape of the magnet assembly is configured to partially enclose the RF Coil and thus limits the electromagnetic flux the RF coil 200 is exposed to, thus partially shielding the coil 200 to reduce electromagnetic noise. This makes it very robust to any external interferences. In some embodiments further noise reduction uses conductive RF shielding fabric material to cover the subject/patient to further reduce electromagnetic interference. In some embodiments additional denoising strategy using active noise cancelation with pickup RF coils can be used to further improve signal to noise.

Appropriate NMR Console Electronics (for example those supplied by Resonint Ltd., Wellington NZ) include an RF Transceiver, serial and parallel I/O lines for running triggers for temperature monitoring and control, RF power amplifier (for example as supplied by TOMCO, Stepney SA Australia), software encoding sequences for rapid signal calibration.

It has been found that a low field system can provide perfusion measurements. This is achieved by improving the effective signal quality by carefully controlling the region in which sampling and detection occurs. In a sense, the system disclosed herein 'images' only a single pixel.

Figure 9:
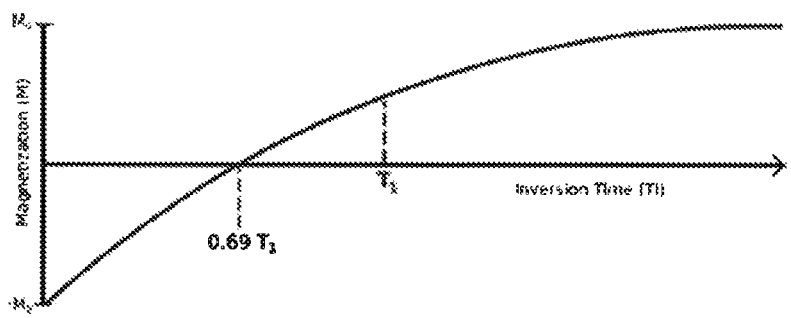
FIG. 9 is a plot showing the recovery of bulk longitudinal magnetisation Mz after an inversion pulse, illustrating how a carefully timed pulse can eliminate the signal due to the affected spins, potentially isolating a signal of interest.

The pulse sequence used has some similarity to an arterial spin labelling (ASL) technique used by conventional MRI systems. This known technique, called Flow-sensitive Alternating Inversion Recovery (FAIR), is a variant of the known Pulsed Arterial Spin Labelling (PASL) sequence. The FAIR protocol makes a comparison between the signal response of two slightly different inversion recovery pulse sequences. Each sequence consists of a 180-degree inversion pulse, followed by an image acquisition after a short delay. The first sequence uses a slice selection gradient to limit the initial 180-degree pulse to invert only the spins within the plane of imaging. The second sequence does not apply a gradient, instead allowing the 180 pulse to affect the entire sensitive volume. As FIG. 9 indicates, by carefully timing the delay between inversion and image acquisition, the signal due to the inverted spins can be mostly suppressed. The 180-degree pulse of the first sequence does not interact with the blood that will soon flow into the plane of imaging. Therefore, the observed signal difference between these two sequences will relate to the rate at which new blood is entering the tissue.

While there are many competing ASL protocols that are both published and proven, these protocols were designed for use with higher field medical MRI systems, with large sensitive volumes and comprehensive gradient coils. The 9 MHz inhomogeneous field NMR system disclosed herein does not possess either of these features, so any protocol implementation must be reconceived to function without them.

Inhomogeneous field NMR systems are not usually equipped with gradient coils, as multi-pixel imaging is not within the scope of such systems. Therefore, standard spatially related measurement protocols cannot in general be directly translated from higher field systems.

However, it has been found that one can take advantage of the naturally present gradient of the inhomogeneous field.

Figure 10:
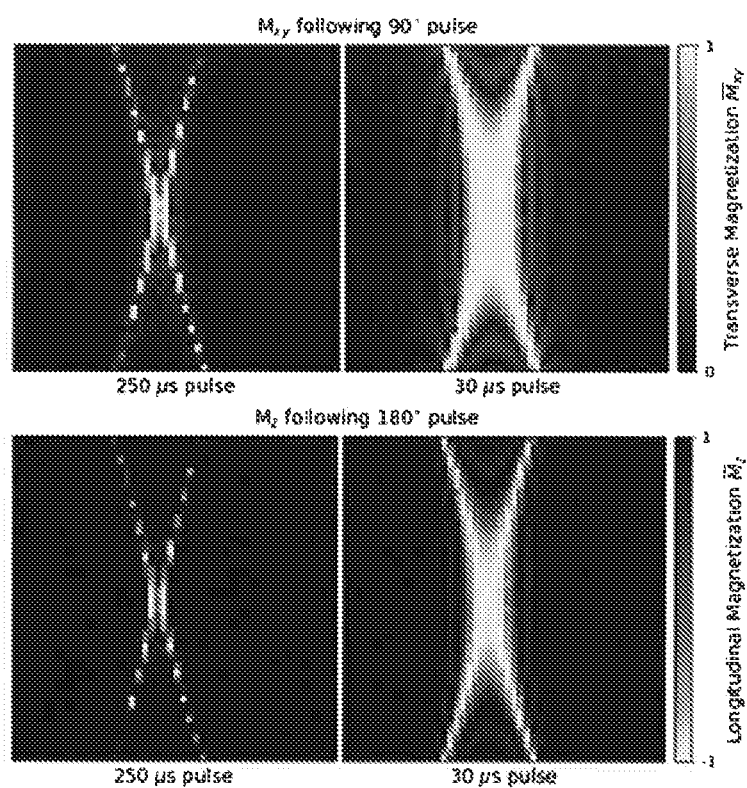
FIG. 10 shows transverse and longitudinal magnetisation maps (X-Z plane), resulting from long and short pulse lengths.

As described above, the 9 MHz prototype magnet is a homogeneous region (sweet spot)-based system. At the centre of the homogeneous region (sweet spot) the magnetic field is relatively homogeneous, with the $B_0$ gradient gradually increasing with distance from the centre of the homogeneous region (sweet spot). Since the homogeneous region (sweet spot) doesn't have a sudden cut-off between homogeneous and inhomogeneous, the effective size of the homogeneous region (sweet spot) depends on the frequency bandwidth of the excitation pulse applied. This allows for a large or small volume to be excited by applying a wide or narrow bandwidth pulse, respectively. Representations of the shape of the excitation volumes are shown in FIG. 10, demonstrating the X-like shape and the dramatic effect of pulse bandwidth.

The bandwidth of an excitation or inversion can be manipulated by changing the shape, duration, or form of the RF pulse. For example, Shinnar-Le Roux (SLR) pulses are shaped to reduce bandwidth and allow for finer frequency selection.

For a standard hard pulse, the bandwidth is inversely related to the duration. By compensating with the RF amplitude, two hard pulses can have equivalent flip angle, but a substantially different frequency profile. Going beyond singular RF pulses, the bandwidth of an inversion can be improved by using certain composite pulses.

A composite pulse is a series of RF pulses that, together, achieve a specific effect. The composite pulse used in at least one example or embodiment consists of two 90 degree×pulses with a 180 degree y pulse in-between, together creating an inversion. Within this composite pulse, the rotation induced by the 180 degree y pulse causes field-inhomogeneity related errors in the flip angle of the two 90 degree×pulses to cancel out. This corrects off-resonance spins, resulting in a wider effective bandwidth and a more even inversion than would be achieved by an equivalent single pulse inversion.

A pulse sequence has been designed to achieve an effect similar to the FAIR protocol, but in an inhomogeneous field. For the purposes of ease of description in this disclosure, this new measurement protocol will be referred to as Inhomogeneous Flow-sensitive Alternating Inversion Recovery (IF-AIR). The IFAIR sequence utilises an Inversion Recovery pattern: an inversion pulse, followed by an excitation pulse and then a Carr-Purcell-Meiboom-Gill (CPMG) acquisition.

Figure 11:
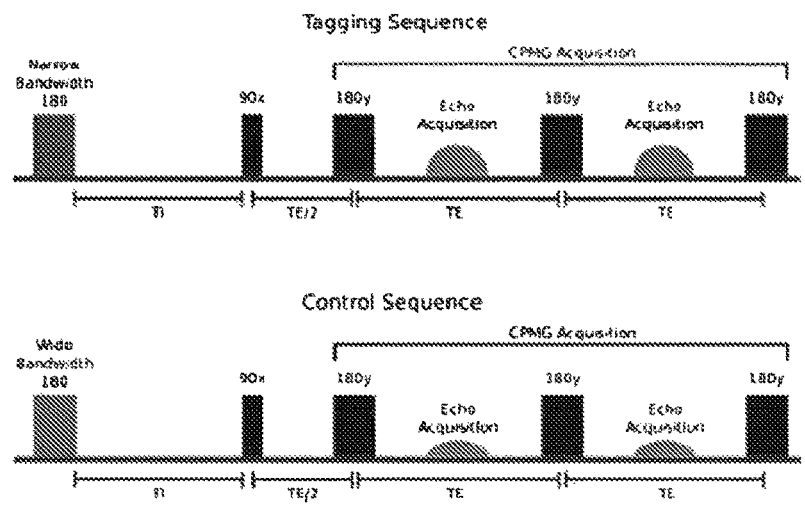
FIG. 11 shows the general pulse sequence outline for the ASL system disclosed herein. The implementation of the initial inversions can vary dependent on requirements as disclosed.

Two subtly different inversion recovery RF pulse sequences have been defined. The first sequence may be termed a tagging sequence. This sequence uses a consistent narrow bandwidth (or at least a bandwidth that is narrower than that of the inversion pulse for the second pulse sequence) for all pulses, including the initial inversion. The second inversion recovery RF pulse sequence may be termed a control sequence. This sequence is substantially the same as the first sequence, except the bandwidth of the initial inversion is modified to be wider than the inversion pulse for the first sequence, preferably by using a shorter and stronger RF pulse. The exact implementation of the inversion pulses in both sequences varies, as the bandwidth-modifying options disclosed above can be explored. The CPMG echoes are summed to improve the signal-to-noise ratio. FIG. 11 shows the structure and relative timing of this pulse sequence.

The IFAIR protocol detects flow velocity by analysing the difference in signal response between the first and second pulse sequences i.e., by comparing the signals.

As described above, the second pulse sequence has an inversion pulse that has a wider bandwidth than that for the first sequence. Therefore, this inversion pulse inverts spins in a larger volume of the target tissue, which may be referred to as a control volume. The control volume includes the acquisition volume, and extends beyond the acquisition volume by a margin to provide an inversion buffer. Because the excitation and acquisition segments of the second sequence are configured at the narrower bandwidth of the first sequence, that acquisition is still sensitive to the control volume. Notably, because the spins in the control volume have been inverted, the spins of any fresh fluid that enter the control volume during execution of the sequence are not detected. Therefore, the second sequence can be considered as a flow-insensitive control sequence.

The first pulse sequence, by virtue of having a narrower bandwidth, affects an acquisition volume within the target tissue. The inversion pulse is configured to suppress spins in the acquisition volume, so that it is essentially only the non-inverted spins from fresh fluid (e.g., blood) that enters the control volume as the pulse sequence is being executed that are detected by the acquisition. Therefore, the first sequence can also be considered to be a flow-sensitive sequence, or a tagging sequence.

The first and second pulse sequences may be changed in order i.e., the second sequence may be performed prior to the first sequence. It is preferable to perform the pulse sequences one after the other.

Comparison of the signals acquired from the first and second pulse sequences should therefore reveal a difference that is indicative of the fresh fluid that has entered the acquisition volume. However, due to the inhomogeneous field, the comparison between the affected volumes of the control and tagging inversion can be difficult to detect, requiring careful consideration of applicable flow scenarios.

To maintain clarity in this disclosure, it is necessary to define several terms relating to the various features of the pulse sequence introduced above. These terms are set forth in Table 1 below, will assist with later explanations of experimental development and analysis.

TABLE 1

| Term | Meaning |
| --- | --- |
| Tagging Sequence | Inversion recovery (IR) sequence where the inversion bandwidth matches to the acquisition bandwidth |
| Control Sequence | IR sequence where the inversion bandwidth is substantially wider than the acquisition bandwidth |
| Tagging/Control Inversion | The inversion pulse of the tagging or control sequence |
| Tagging/Control Signal | The signal response $S_t$ of the tagging or control sequence |
| Tagging/Control Volume | The region of space affected by the tagging or control inversion |
| Acquisition Volume | The region of space where the acquisition CPMG records output signal |
| Inversion Buffer | The minimum length between borders of the acquisition volume and the control volume |

When implemented, these two complementary sequences (i.e., the control sequence and the tagging sequence) are performed back-to-back, forming part of an experimental cell. This cell is repeated several times and averaged to improve the signal-to-noise ratio. The full repeating cell also includes an inversion-less acquisition, which provides the baseline, fully recovered signal $S_\infty$. Since the tagging and control sequences only differ in the initial inversion, one measurement of $S_\infty$ can serve as the baseline signal for both. To enable an improved processing approach, which is disclosed further below, the tagging and control sequences may also be repeated, each with a very short inversion time (TI), providing a measure of the system after inversion but before significant recovery can occur.

Table 2 below is a summary of the different signals acquired in each experimental cell and the corresponding notation.

TABLE 2

| Measurement | Notation | Pulse Sequence |
| --- | --- | --- |
| Core Measurements | | |
| Baseline Signal | $S_\infty$ | Standard CPMG sequence, no initial inversion |
| Tagging Signal | $S^t(t)$ | IFAIR Tagging sequence, where t is inversion time |
| Control Signal | $S^c(t)$ | IFAIR Control sequence, where t is inversion time |
| Optional $M_{z,0}$ calibration measurements | | |
| Tagging Calib. | $S^t_0$ | IFAIR Tagging sequence, with minimum inversion time |
| Control Calib. | $S^c_0$ | IFAIR Control sequence, with minimum inversion time |

Interleaving these different measurements ensures that any changes to the system that occur during the experiment will have an approximately equal effect on each output signal, rather than skewing the results unpredictably.

The baseline reading allows for the normalised signal $\overline{S}$ (refer to equation 1 below) to be calculated, improving consistency between experiments. This normalisation corrects for any offset or drift in signal strength due to sample characteristics and position or magnet temperature, allowing for better result quantification.

$$\overline{S}(t) = \frac{S(t)}{S_\infty} \qquad \text{Equation 1}$$

To assist the addressee, a general mathematical description of the signal response of the IFAIR sequence is set out below.

The two relevant contributions are the $T_1$ recovery and the effective replacement of the spins within the acquisition volume due to flow. All other effects either can be controlled for, such as consistency of sample position, or are insignificant in comparison.

Equation 2 is the most general expression describing the effects of these factors on the normalised observed signal S $$\overline{S}(v, t) = \qquad \text{Equation 2}$$
$$\overline{M}_z \times [1 - \eta(v, t)] + \eta(v, t) = \eta(v, t) \times [1 - \overline{M}_z(t)] + \overline{M}_z(t)$$

Where η(v,t) is a function describing the fractional signal contribution of spins that are replaced in inversion time t due to average flow velocity v and $\overline{M}_z(t)$ is the longitudinal magnetisation before a 90 degree excitation at time t, normalised by the equilibrium magnetisation. The forms of both η and $\overline{M}_z(t)$ functions depend on the parameters of the pulse sequence and the properties of the sample. Various possible solutions can be proposed, modelled, and validated.

Equation 2 can be applied to the special case of the $M_{z,0}$ calibration measurements. In this case, the flow dependence can be ignored as the short inversion time means that any effects will be vanishingly small. Taking the zero-time limit and substituting in the $T_1$ relaxation solution to the Bloch equations, gives Equation 3:

$$\lim_{t \to 0} \overline{S}(t) = \lim_{t \to 0} \overline{M}_z(t) = 1 - [1 - \overline{M}_{z,0}] = \overline{M}_{z,0} \qquad \text{Equation 3}$$

where $$\overline{M}_{z,0} = \frac{M_{z,0}}{M_{z,eq}}$$

This can be applied to both the tagging and control calibrations and shows that the resulting signal can be used as a direct measurement of the initial magnetisation due to the corresponding inversion pulse. $\overline{M}_{z,0}$ can be understood as the inversion quality; $\overline{M}_{z,0}=-1$ corresponds to a perfect inversion, where every spin in the sample has been rotated precisely 180 degrees from equilibrium. $\overline{M}_{z,0}$ may differ between measurements, depending on system calibration and pulse parameters.

Phantom based experiments have demonstrated the basic principles of the IFAIR protocol described above. The experiments demonstrated that the IFAIR sequence could generate a signal that was dependent on the flow velocity of the flow circuit. These experiments were performed on a simple system, with undoped water, no tissue phantom and regular single pulse inversions, to keep confounding factors to a minimum.

Figure 12:
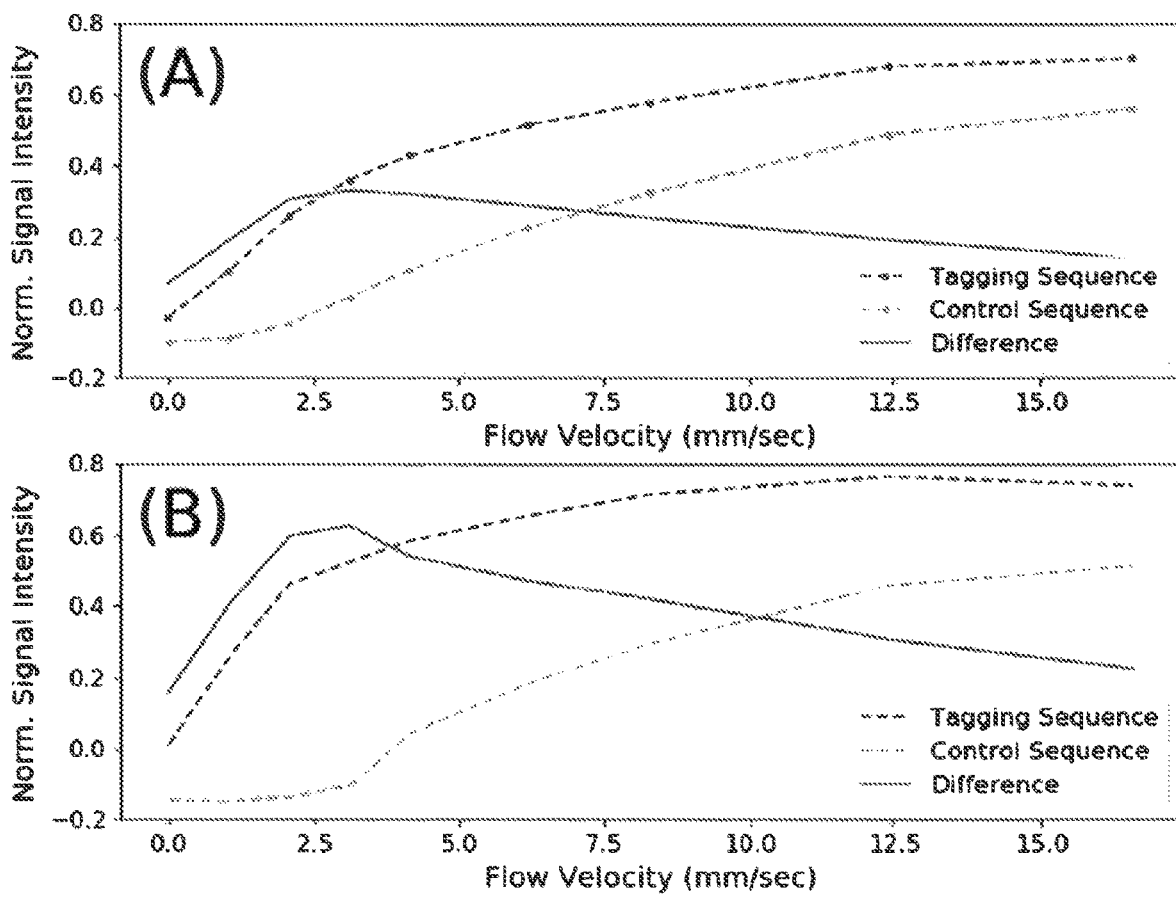
FIG. 12 shows Inhomogeneous Flow-sensitive Alternating Inversion Recovery (IFAIR) sequence response over the full range of the pump. Measured on undoped distilled water with $T_1$=2135 plus or minus 5 ms. (A) 100 us tagging inversion. (B) 200 us tagging inversion.

FIG. 12 shows the characteristic signal-flow curves over the full range of available flow rates, at two different tagging inversion pulse lengths. It is clear that there is a threshold of flow velocity beyond which the buffer of inverted spins from the control inversion is not sufficient to prevent recovery due to flow. A comparison of the two plots shows that the range of flow rates over which the control signal remains unaffected is larger when the narrower bandwidth 200 ms pulse is used. This follows the expected behaviour, as a smaller acquisition volume allows for the control inversion to produce a larger buffer of inverted spins.

The most useful part of these signal-flow curves is the roughly linear region observed at lower flow velocities. In this region, the control signal does not undergo any substantial recovery, upholding the basic principles behind the protocol. The range of flow velocities where this occurs depends primarily on the bandwidths of pulse lengths used and the inversion recovery time (TI) over which flow is observed. These parameters can be optimized to create a sequence sensitive to the relevant magnitude of velocity.

These plots highlight an issue with the use of the raw signal difference to estimate an unknown flow, namely the presence of a signal mismatch between the tagging and control curves at zero flow. This offset, resulting from unevenness in the quality of the initial inversion pulses, can be a barrier to both qualitative and quantitative flow measurements. While the overall signal-flow trend of interest is relatively unaffected, the offset can obscure the relative recovery due to flow, unless the system can also be measured in a zero-flow state. This issue will be addressed in more detail further below in which an improvement to the pulse sequence is demonstrated and a method of flow-independent compensation that resolves the issue is introduced.

A modification proposed to the basic inversion recovery sequence is the use of composite inversion pulses. These pulses, as described above, use a brief series of individual pulses to theoretically achieve a more even inversion across a wider bandwidth. FIG. 13A shows a comparison between a pair of flow sweep experiments, one acquired using the standard single pulse inversion sequence and one using 90x–180y–90x composite inversions.

These plots show several advantages arising from the composite pulses. Firstly, the control signal shows more resistance to recovery due to the flow rate, remaining at the initial zero-flow response over a larger flow range. This indicates that, the bandwidth of the inversion is improved. Secondly, the zero-flow response of the tagging signal displays a much better match to the control signal when composite pulses are employed. Again, this can be attributed to an improved pulse bandwidth that more evenly covers the acquisition volume. FIG. 13B shows how, at lower flow rates, these improvements result in a signal difference that starts from zero in the absence of flow and increases steadily as flow is introduced.

FIG. 14 shows the simulated longitudinal magnetisation resulting from various duration standard and composite pulses. These results were generated from a Bloch equation simulator, with a pulse spacing of 2500 ms. The plots show how the composite pulses can substantially improve the range over which near-optimal inversion occurs, improving the evenness of inversions. However the size of this effect appears to be dependent on the original pulse bandwidth, and so is more significant for shorter, wider bandwidth pulses.

The results discussed above have all been acquired on undoped distilled water with an extended value of $T_1$. The $T_1$ of blood and tissue differ significantly from pure water, especially in in-vivo conditions. Since the ideal inversion time (TI) of the sequence is dependent on the $T_1$ of the sample, it is helpful to demonstrate these effects on the signal-flow curves. FIG. 15 shows the flow dependence at $T_1$ values of 2135 ms, 615 ms and 310 ms. To match, TI parameters of 1300 ms, 400 ms and 200 ms, respectively, were used. These values were selected for their good signal nulling characteristics, at approximately 65% of the corresponding $T_1$ value.

The results show that the dominant effect of a modified $T_1$ is a reduction in sensitivity to flow. This is because a shorter TI results in a correspondingly reduced spin displacement following the inversion pulse, effectively replicating the behaviour of a lower flow rate. Other than this change, no significant differences are observed. In order to work towards the goal of in-vivo experiments, all subsequent experiments were performed using water doped to approximately match the relevant tissue $T_1$ of 350 ms in a 0.19 T $B_0$ field.

The homogeneous region (sweet spot) of the magnet has one long axis and two, roughly equal, shorter axes. Since the flow-dependent changes in signal response are due to the proportion of replacement of the spins in the homogeneous region (sweet spot), the direction of the flow will change the results. The majority of other experiments were performed with the flow pipe aligned with the longer y-axis.

FIG. 16 shows that a similar flow-dependence occurs when pipe is directed along the shorter x-axis, but with a much higher sensitivity. The control signals do not display any flow-dependent recovery, indicating that, despite the steeper gradients, the control volume is still large enough compared to the acquisition volume to create a usable inversion buffer.

A choice of TI for an experiment is the value where the signal contribution from unreplaced spins is approximately zero (as described in above). However, the chosen TI value interacts with the flow sensitivity of the measurement, as the spin displacement distance during the experiment depends directly on the time over which the flow is observed. Additionally, the $T_1$ measured by a standard IR pulse sequence is affected by the rate of flow of a sample. This can confound estimates of true $T_1$ in situations where a zero-flow calibration cannot be performed, such as in-vivo experiments.

A potential solution to this calibration issue is to perform the IFAIR sequence at a range of TI values, allowing for a well-performing value to be directly identified. FIGS. 17 and 18 show how the tagging and control signals change with TI at 0 mm/sec (stationary) flow, 1 mm/sec flow and 2 mm/sec flow. These Figures show that the difference between the two signal responses remains relatively consistent within a generous range of TI. The largest difference appears when TI is approximately equal to the $T_1$ of the sample. FIG. 19 shows how the signal difference consistently reaches a peak when TI matches to $T_1$.

This result can be validated through comparison to a model that takes into account the two competing effects of TI on signal response. Applying the low flow velocity Uniform Length model introduced above.

A perfect inversion pulse will exactly flip every affected spin by 180 degrees. This is impossible in practise due to $B_0$ and $B_1$ field inhomogeneity—the degree to which this effect is achieved is referred to as the 'labelling efficiency' or as the 'quality' of the inversion pulse, and is equivalent to the normalised instantaneous longitudinal magnetisation $\overline{M}_{z,0}$.

While the adoption of composite pulse inversions helped to mitigate the differences in inversion pulse quality between the tagging and control pulses, the underlying issue still remained. This was especially apparent when employing longer, narrower bandwidth tagging pulses to increase sensitivity to low velocity flow, as the more limited bandwidth reduced the effectiveness of the composite pulses (see FIG. 14).

A more robust solution was to use the minimum TI calibration measurements described above to directly measure $\overline{M}_{z,0}$ and to adjust the tagging and control signals to compensate. The impact of variations in $\overline{M}_{z,0}$ on the time evolution of $\overline{M}_z(t)$, and consequently the recorded IR signal, is established by the $T_1$ relaxation solution to the Bloch equations. This equation states that, following an excitation or inversion, the normalised longitudinal magnetisation recovers from $\overline{M}_{z,0}$ when t=0, to +1, when t>>$T_1$. Since $\overline{M}_{z,0}$ is highly dependent on interactions between RF frequency, bandwidth and the exact inhomogeneity of the $B_0$ field, this introduces a varying offset to the observed signal, restricting the accuracy of comparisons between experiments.

This can be resolved by defining a transform $f_{M_{z,0}}$ to map results of each experiment onto a consistently defined domain, correcting for the offset, as seen by equation 4.

$$f_{M_{z,0}}:[\overline{M}_{z,0},1] \mapsto [-1,1] \qquad \text{Equation 4}$$

Due to the properties of the exponential function that governs $T_1$ recovery, defining $f_{M_{z,0}}$ as a simple linear resampling onto the new range will not affect the time constant of the recovery curve, preserving the relevant information. This eliminates the effects of the imperfect inversion from the signal, isolating the flow-related information and artificially replicating the behaviour of an ideal, homogeneous field system. The flow velocity v and inversion time t dependence of the new scaled signal $\overline{S}_{sc}$ is given by equation 5.

$$\overline{S}_{sc}(v, t) = \eta(v, t) \times \left[1 - \left[1 - 2e^{-\frac{t}{T_1}}\right]\right] + \left[1 - 2e^{-\frac{t}{T_1}}\right] \qquad \text{Equation 5}$$

Applying this to experimental data, FIG. 20 demonstrates how the difference curve of the scaled signals consistently begins from zero at zero flow, and increases steadily from there, regardless of the zero-flow offset of the unscaled signals. This signal processing strategy is dependent on the accuracy of the calibration signals, but both the baseline measurement ($S_\infty$) and the short TI measurements ($S_0^t$ and $S_0^c$) offer reasonably good signal-to-noise.

A step towards quantification of flow velocity is to convert from the tagging and control signals $S^t$ and $S^c$, which depend on both spin replacement and $T_1$ relaxation, into a quantity that describes only the recovery due to spin replacement.

This can be shown using the equations that govern each signal's dependence on spin replacement and $T_1$ recovery. In this case, it is assumed that the flow velocity—inversion time product is small enough that the control inversion covers all spins contributing to the control signal. Applying this assumption to equation 5 results in equations 6 and 7 for the tagging and control signals.

$$\overline{S}_{sc}^c(v, t) = 1 - 2e^{-\frac{t}{T_1}} \qquad \text{Equation 6}$$

$$\overline{S}_{sc}^t(v, t) = \eta(v, t) \times \left[1 - \left[1 - 2e^{-\frac{t}{T_1}}\right]\right] + \left[1 - 2e^{-\frac{t}{T_1}}\right] \qquad \text{Equation 7}$$

By rearranging and substituting $\overline{S}_{sc}^c$ into $\overline{S}_{sc}^t$ the spin replacement fraction $\eta$ can be represented in only terms of the measured signal quantities, as shown by equation 8.

$$\eta(v, t) = \frac{\overline{S}_{sc}^t - \overline{S}_{sc}^c}{2} \cdot e^{\frac{t}{T_1}} \approx \frac{\overline{S}_{sc}^t - \overline{S}_{sc}^c}{1 - \overline{S}_{sc}^c} \qquad \text{Equation 8}$$

The right-most simplification is valid if and only if the $T_1$ of the mobile spins is approximately shared by all signal contributing spins. This is valid for flow phantoms, but unlikely to be applicable in real tissue. The general expression is valid for any arbitrary shape of the acquisition volume but depends on the assumption that the control inversion is equally effective over all incoming spins. As established earlier, this is reasonably accurate at low flows and with small tagging inversion bandwidths, but is not quite true.

FIG. 21 shows how this measure varies with flow rate at different values of TI. Longer TI experiments result in higher values of $\eta$, due to the increased displacement distance during the experiment. Comparing the two plots shows that the narrower bandwidth 500 ms experiment resulted in a larger recorded proportion of spin replacement. This is due to the reduction in acquisition volume size combined with the linear flow of the circuit.

FIG. 22 shows the same data but scaled by the TI of the measurement.

This gives an estimate of the spin replacement fraction per second of inversion recovery time (Defined as $\zeta=\eta/TI$), and allows direct comparison between the 3 curves shown on each plot. The 250 ms tagging pulse plot shows excellent agreement between the 3 TI values at all measured velocities; the 500 ms tagging pulse plot shows excellent agreement at flows below 1 mm/sec, but diverges somewhat above this point. This divergence is likely due to the shape of the acquisition volume at this very narrow bandwidth, with the longer TI spin displacement partially penetrating the thin regions and reducing the proportional response.

FIGS. 21 and 22 also display a set of simulations. The relatively good match between this simulated data and the actual data shows that the bowed shape of the $\zeta$-velocity curves is due to a similar combination of rapidly replaced regions and slowly replaced regions.

In the context of the pipe-based tissue phantom, where all signal-contributing spins can be assumed to be flowing and that flow is unidirectional, the spin-replacement-fraction-per-second $\zeta$ is related to the flow velocity. As established above, the exact relation depends on the shape of the acquisition volume, but estimates can be made by applying a simple model. The approach adopted is to treat the shape as having a single flow-aligned length and a uniform excitation and inversion effectiveness over the entire volume.

Under this approximation, the phantom flow velocity can be estimated by using equation 9.

$$v_{model} = \ell_{model} \times \frac{\eta}{TI} \qquad \text{Equation 9}$$

FIG. 23 shows how the estimated flow velocity compares to the directly measured flow velocity. The resulting estimation does match to the general trend. The appropriate length parameter for the UL model does scale with the tagging bandwidth and therefore with the size of the acquisition volume; FIG. 23A was generated with $\ell_{model}$=4.4 mm and FIG. 23B was generated with $\ell_{model}$=2.2 mm. This indicates that, in this case, the average flow-aligned length is approximately doubled when the bandwidth of the pulses is doubled.

In an inhomogeneous field, the result of a standard Inversion Recovery (IR) measurement of $T_1$ is affected by the rate of flow of the sample. This is due to the same mechanism that is observed and measured by the IFAIR sequence, the replacement of spins within the acquisition volume by spins that were not affected by the initial inversion. The tagging sequence of the IFAIR protocol, presented in FIG. 11 is similar to a standard IR sequence, but a clear difference is the implementation of the initial inversion. This shows that if the tagging sequence is equivalent to the standard, flow-affected IR sequence, then at low flow velocities, the control sequence can be used to measure the true, stationary $T_1$ of an actively flowing sample. This can be clearly seen in equations 6 and 7, presented earlier.

Once the processing technique described above has been applied, the $T_1$ recovery of the resulting signals follows a simple exponential recovery process with just one unknown parameter. This allows $T_1$ to be estimated from a single time point. This means that both the standard, flow-affected $T_1$ and the flow-compensated $T_1$ can be extracted from the IFAIR sequence outputs with no additional measurement time.

FIG. 24 shows how the estimated $T_1$ changed with flow velocity, during the same experiment presented in the previous section. The plots clearly show that, at zero flow, both estimates match well to the stationary IR sequence result of $T_1$=320 plus or minus ms and that, over the measured range, the control-derived $T_1$ is unaffected by flow velocity.

In order to prove viability in a clinical setting, in-vivo experiments have been performed.

One experiment aimed to observe changes in the blood perfusion of muscle tissue in a human arm, by repeatedly performing the IFAIR protocol, outlined above, during alternating periods of rest and muscle contraction. Due to the changes in metabolic demand, the blood perfusion to the muscle should increase during periods of contraction, and return to baseline during periods of rest.

Muscle contraction was achieved through actively squeezing a section of compressible foam, as consistently as possible, over a 3 minute period. To accelerate the acquisition process, the inversion quality measurements $S_{t,0}$ and $S_{t,0}$ were only recorded once at the start of the experiment, and scaled to match any minor changes to the baseline signal $S_\infty$ during the experiment. The pulse sequence timing was TR=2000 ms, TE=2500 us, with 40 us control and 500 us tagging inversions. TR was long enough for complete recovery to occur between each scan. At each time point, 8 scans each of $S_\infty$, $S_{t,0}$ and $S_{e,0}$ were acquired, with TI=300 ms. Each full set of scans took just under 60 seconds to acquire.

The arm was placed on a perspex sheet, resting on the RF coil, with the homogeneous region (sweet spot) approximately 25 cm proximal of the wrist joint, targeted at the bulk of superficial wrist flexor muscles found part way along the anterior forearm. The primary muscles of interest were the Flexor Digitorum Superficialis and the Palmaris Longus muscles, due to their involvement in the function of the grip and their superficial position in the forearm. The centre of the homogeneous region (sweet spot) was estimated to be approximately 5 mm beyond the surface of the skin. The arm and magnet were covered by a section of conductive fabric to reduce the noise of the signal.

FIG. 25 shows the evolution of the tagging and control signals, over time, along with an indication of the muscle activation periods. When the arm muscles are activated through gripping, a very clear increase in the tagging signal is observed, but the control signal remains unaffected. Once the muscle is relaxed the tagging signal quickly returns to a near baseline value. The strength of the tagging signal during muscle activation is not always consistent, but this reflects the difficulty of maintaining a consistent level of muscle activation over a several minute period which leads to moderate variations in local perfusion.

FIG. 26 shows the spin replacement fraction $\eta$ per second, estimated from the same data. In this case, the $T_1$ of blood and tissue should differ, so an estimate for $T_1$, blood is required (see equation 8). A blood $T_1$ of 775 plus or minus 22 ms at 0.2 T is known; this value was used in the calculation. Since a single, constant value was used for the conversion, the shape of the curve matches the signal difference $\Delta S$.

Regardless, the plot makes it clear that at rest, the blood perfusion of forearm muscle is relatively low, with approximately a third of the signal contributing spins in the 500 ms acquisition volume being replaced each second. These results imply that the rate of replacement of blood in the muscle capillary bed increases by a factor of up to 5 times the resting value, and is able to maintain that rate for a period on the order of minutes. This aligns with literature on muscle perfusion, where massive percentage increases to muscle perfusion during exercise is well established behaviour.

FIG. 27 shows the $T_1$ values derived from the two IFAIR sequences. As with the flow phantom, the control sequence produces a steady value, unaffected by assumed changes in flow, whereas the standard IR adjacent tagging sequence value dips at higher flow. The at rest $T_1$ values of this experiment are in good agreement with the independent IR based $T_1$ measurements performed in the same session—$T_1$=330 plus or minus 20 ms.

A second in vivo experiment used a portable magnetic resonance (MR) system as depicted in FIGS. 1 to 6 and 8 and described in detail above, in an ovine stroke model to study the pathophysiological changes that occur following ischemic stroke. The protocol for this experiment was approved by the Animal Ethics Committee of the University of Adelaide.

In this experiment, a cohort of 11 merino sheep were divided into two groups. A first group of 6 underwent permanent occlusion surgery (hereinafter referred to as "the permanent group" or "permanent insult model"). A second group of 5 underwent temporary occlusion surgery (hereinafter referred to as "the transient group" or "the transient stroke model"). A baseline, or "healthy", measurement was obtained using the portable MR system. Once the baseline measurements had been taken, access to the brain was obtained by a craniotomy. The Middle Cerebral Artery (MCA) was located and occluded using either electrocauterization for the permanent group (permanent insult model), or a mini aneurysm clip for the transient group. The bone was reinstated, and access was closed up before further measurements were made.

The animals were monitored using the portable MR system for a total of 4 hours. In the transient group, after a 2-hour period, the brain was accessed again and the clip was removed, opening the MCA, before closing the craniotomy and continuing to monitor with the portable MR system. To ensure future accurate placement and repositioning of the portable MR system, a custom 3D printed plate was securely attached to the head of each animal using vet wrap so that the portable MR system could be easily aligned for future monitoring.

Following the low field MR monitoring, the animals were immediately taken to an MRI suite (3 T Siemens Skyra). Examples of MRI scans by way of non-limiting examples include: $T_1$-weighted anatomical, $T_2$-weighted FLAIR (SPACE), dynamic contrast-enhanced (DCE) with Gadobutrol contrast (TWIST), magnetic resonance angiography (MRA), $T_1$ mapping (VFA VIBE) and diffusion-weighted imaging (DWI). The MRI images provide a true value for comparison to the results obtained from the portable MR system used in this experiment, which measures $T_2$, apparent diffusion coefficient (ACD), and perfusion. In this experiment, the MRI protocol took over about 60 minutes to complete.

In this experiment, MRI scanning was performed on a 48 channel 3 T Siemens Magnetom Skyra (Siemens Healthcare, Erlangen, Germany) with a posterior 20 channel head coil. $T_1$ weighted DCE-MRI time series were acquired with (TE/TR=1.98/5.06 ms) and a flip angle of (12°). Injection commenced after acquisition of the second DCE scan, allowing for the acquisition of a baseline signal prior to contrast enhancement. A gadolinium based contrast agent (Gadobutrol, commercial name Gadovist, Bayer, Australia) was administered via an intravenous catheter (20 G, Terumo SURFLO) placed in the jugular vein. A power injector was used to administer gadolinium as a bolus (0.1 mL/kg; 3 mL/second) followed by a saline flush (0.5 mL/kg; 5 mL/second).

The DCE-MRI analysis was performed using several tools including a 3D Slicer, imagej, rocketship, dcemri.jl and custom python code following practices that are well known in the art, including for example, but not limited to:
  Estimation of $B_1$ field inhomogeneity,
  Calculation of $T_{1,0}$ maps,
  Conversion from DCE signal image to $R_1$,
  Conversion from Ri to contrast agent concentration,
  Determination of Arterial Input Function (AIF) estimate,
  Conversion from AIF to Cp,
  Pharmacokinetic model fitting to the time series data.

Results

Data obtained from the portable MR system for the permanent group (permanent insult model) showed a decrease in apparent diffusion coefficient (ADC), tissue perfusion (blood replacement fraction), and an increase in $T_2$, which correlated consistently with MRI images (as shown in FIG. 29A). The mirror hemisphere was surgically untouched and was used as a healthy or baseline reference.

The transient group (transient stroke model) simulates a stroke, followed by thrombus recanalization. Data obtained from the portable MR system for the transient group showed a temporary decrease in apparent diffusion coefficient (ADC) and tissue perfusion, when an aneurism clip was applied (stroke phase) (as shown in FIG. 29B).

Comparably, MRI data showed no difference at the 5-hour time point, when the clip was removed and signals had recovered. This was clinically expected and correlates with previous studies of transient ischemia such as those shown in Dorsten et al. (2002) and Moseley et al. (1990).

While the apparatus and methods of this disclosure have been described in terms of the embodiments included herein, it will be apparent to those of ordinary skill in the art that variations may be applied to features or integers of the apparatus and/or methods described herein without departing from the concept, spirit, and scope of the disclosure. All such similar substitutes and modifications apparent to those skilled in the art are deemed to be within the scope, and concept of the disclosure as defined by the appended claims.

REFERENCES

F. A. van Dorsten et al., "Dynamic changes of ADC, perfusion, and NMR relaxation parameters in transient focal ischemia of rat brain," *Magnetic Resonance in Medicine*, vol. 47, no. 1, pp. 97-104, 2002, doi: 10.1002/mrm.10021.

M. E. Moseley et al., "Early detection of regional cerebral ischemia in cats: Comparison of diffusion- and T2-weighted MRI and spectroscopy," *Magnetic Resonance in Medicine*, vol. 14, no. 2, pp. 330-346, 1990, doi: 10.1002/mrm.1910140218.

The invention claimed is:

1. A low field Nuclear Magnetic Resonance (NMR) perfusion measurement system comprising:
  a magnetic structure configured to receive a body part of an examined subject and to create an inhomogeneous static magnetic field within a test tissue of the examined subject;
  wherein the static magnetic field provides a gradient in the test tissue, and is functioning without gradient coils;
  means to apply a first inversion recovery radiofrequency (RF) pulse sequence and a second inversion recovery RF pulse sequence to the test tissue, wherein an inversion pulse of the first or second pulse sequences has a different bandwidth and inverts a different volume than a corresponding inversion pulse of the other of the first or second pulse sequence;
  wherein the volume inverted by the first and second inversion pulse sequences depend on the different bandwidths; and
  acquisition means to acquire magnetic resonance signal data from the first and second inversion recovery pulse sequences and process the magnetic resonance signal data to provide perfusion data.

2. The perfusion measurement system as claimed in claim 1 wherein the signal data from the first and second pulse sequences is compared to provide an estimation or measurement of at least one of: flow, velocity or perfusion.

3. The perfusion measurement system as claimed in claim 1 wherein each of the inversion recovery RF pulse sequences comprises the inversion pulse, an excitation pulse and a Carr-Purcell-Meiboom-Gill (CPMG) acquisition.

4. The perfusion measurement system as claimed in claim 1 wherein the bandwidth of the inversion recovery RF pulse sequences other than the inversion pulses is the same.

5. The perfusion measurement system as claimed in claim 1 wherein the inversion pulse for the first inversion recovery RF pulse sequence has a narrower bandwidth than the inversion pulse for the second inversion recovery RF pulse sequence.

6. The perfusion measurement system as claimed in claim 5 wherein the first inversion recovery RF pulse sequence affects an acquisition volume within the test tissue.

7. The perfusion measurement system as claimed in claim 5 wherein the inversion pulse of the second inversion recovery RF pulse sequence is configured to invert nuclear magnetic resonance (NMR) spins in a control volume, wherein the control volume exceeds the acquisition volume.

8. The perfusion measurement system as claimed in claim 7 wherein the control volume is configured to provide an inversion buffer.

9. The perfusion measurement system as claimed in claim 1, wherein the system is portable and less than 30 kgs.

10. A method for measuring perfusion comprising:
applying an inhomogeneous static magnetic field to a test tissue of an examined subject with a low field NMR: wherein the static magnetic field provides a gradient in the test tissue, and is functioning without gradient coils;
applying a first inversion recovery RF pulse sequence and a second inversion recovery RF pulse sequence to the test tissue, wherein an inversion pulse of the first sequence has a different bandwidth and inverts a different volume than the inversion pulse of the second pulse sequence and wherein the volume inverted by the first and second inversion pulse sequences depend on the different bandwidths;
acquiring magnetic resonance signal data from the first and second pulse sequences and processing the magnetic resonance signal data to provide perfusion data.

11. The method as claimed in claim 10 further comprising comparing the signal data from the first and second pulse sequences to provide an estimation or measurement of at least one of: flow, velocity or perfusion.

12. The method as claimed in claim 10 wherein each of the inversion recovery RF pulse sequences comprises the inversion pulse, an excitation pulse and a CPMG acquisition.

13. The method as claimed in claim 10 further comprising configuring the bandwidth of the inversion recovery RF pulse sequences other than the inversion pulses to be the same.

14. The method as claimed in claim 10 further comprising configuring the inversion pulse for the first inversion recovery RF pulse sequence to have a narrower bandwidth than the inversion pulse for the second inversion recovery RF pulse sequence.

15. The method as claimed in claim 12 further comprising configuring the bandwidth of the first inversion recovery RF pulse sequence to affect an acquisition volume within the test tissue.

16. The method as claimed in claim 15 further comprising configuring the bandwidth of the inversion pulse of the second inversion recovery RF pulse sequence to invert NMR spins in a control volume, where the control volume exceeds the acquisition volume.

17. The method as claimed in claim 10 further comprising configuring the inversion pulse as a composite pulse.

18. The method as claimed in claim 17 wherein the composite pulse comprises two 90 degree pulses separated by a 180 degree pulse.

19. The method as claimed in claim 10, wherein the method further includes the step of determining whether reduced perfusion has occurred when compared to clinically acceptable levels.

20. A method of diagnosing reduced blood flow or perfusion below clinically acceptable levels in a subject using a low field NMR perfusion measurement system as defined in claim 10, comprising the step of
determining whether the perfusion data falls below clinically acceptable levels at the test site.

* * * * *